US012553922B2

United States Patent
Tsujimoto et al.

(10) Patent No.: US 12,553,922 B2
(45) Date of Patent: Feb. 17, 2026

(54) CURRENT SENSOR

(71) Applicant: Asahi Kasei Microdevices Corporation, Tokyo (JP)

(72) Inventors: Masaki Tsujimoto, Tokyo (JP); Kenji Kai, Tokyo (JP); Kenji Suzuki, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 223 days.

(21) Appl. No.: 18/613,080

(22) Filed: Mar. 21, 2024

(65) Prior Publication Data

US 2024/0319232 A1 Sep. 26, 2024

(30) Foreign Application Priority Data

Mar. 24, 2023 (JP) ................... 2023-048261
Mar. 18, 2024 (JP) ................... 2024-042082

(51) Int. Cl.
*G01R 15/20* (2006.01)
*G01R 15/18* (2006.01)
*G01R 19/00* (2006.01)
*G01R 19/25* (2006.01)
*G01R 33/07* (2006.01)
*G01R 33/09* (2006.01)

(52) U.S. Cl.
CPC ....... *G01R 15/202* (2013.01); *G01R 19/0023* (2013.01); *G01R 19/2506* (2013.01)

(58) Field of Classification Search
CPC ........ G01R 15/18; G01R 15/20; G01R 19/00; G01R 19/10; G01R 33/07; G01R 33/09
See application file for complete search history.

(56) References Cited

U.S. PATENT DOCUMENTS

| 6,995,315 | B2 | 2/2006 | Sharma |
| 11,385,301 | B2 | 7/2022 | Hoegerl |
| 2016/0187388 | A1 | 6/2016 | Suzuki |
| 2018/0156845 | A1 | 6/2018 | Suzuki |
| 2020/0357987 | A1 | 11/2020 | Li |

FOREIGN PATENT DOCUMENTS

| JP | S4842690 | A | 6/1973 | |
| JP | H03148159 | A | 6/1991 | |
| JP | 2002202326 | A | 7/2002 | |
| JP | 2015152363 | | * 8/2015 | ............. G01R 15/20 |
| JP | 2015200546 | A | 11/2015 | |
| JP | 2018036237 | A | 3/2018 | |
| JP | 2018165699 | A | 10/2018 | |
| JP | 2022016475 | A | 1/2022 | |

* cited by examiner

*Primary Examiner* — Neel D Shah

(57) ABSTRACT

A current sensor may include a first support portion and a first lead frame which is made of a material different from that of the first support portion. The current sensor may include: a signal processing IC which has a first surface supported by a first surface of the first support portion and is electrically connected to the first lead frame; at least one magnetoelectric conversion element which is configured separately from the signal processing IC, is mounted on a second surface on a side opposite to the first surface of the signal processing IC, and outputs, to the signal processing IC, a signal processed by the signal processing IC; and a second lead frame which has a second terminal portion, at least a part of which is arranged to face the second surface of the signal processing IC, and through which a measurement current flows.

35 Claims, 20 Drawing Sheets

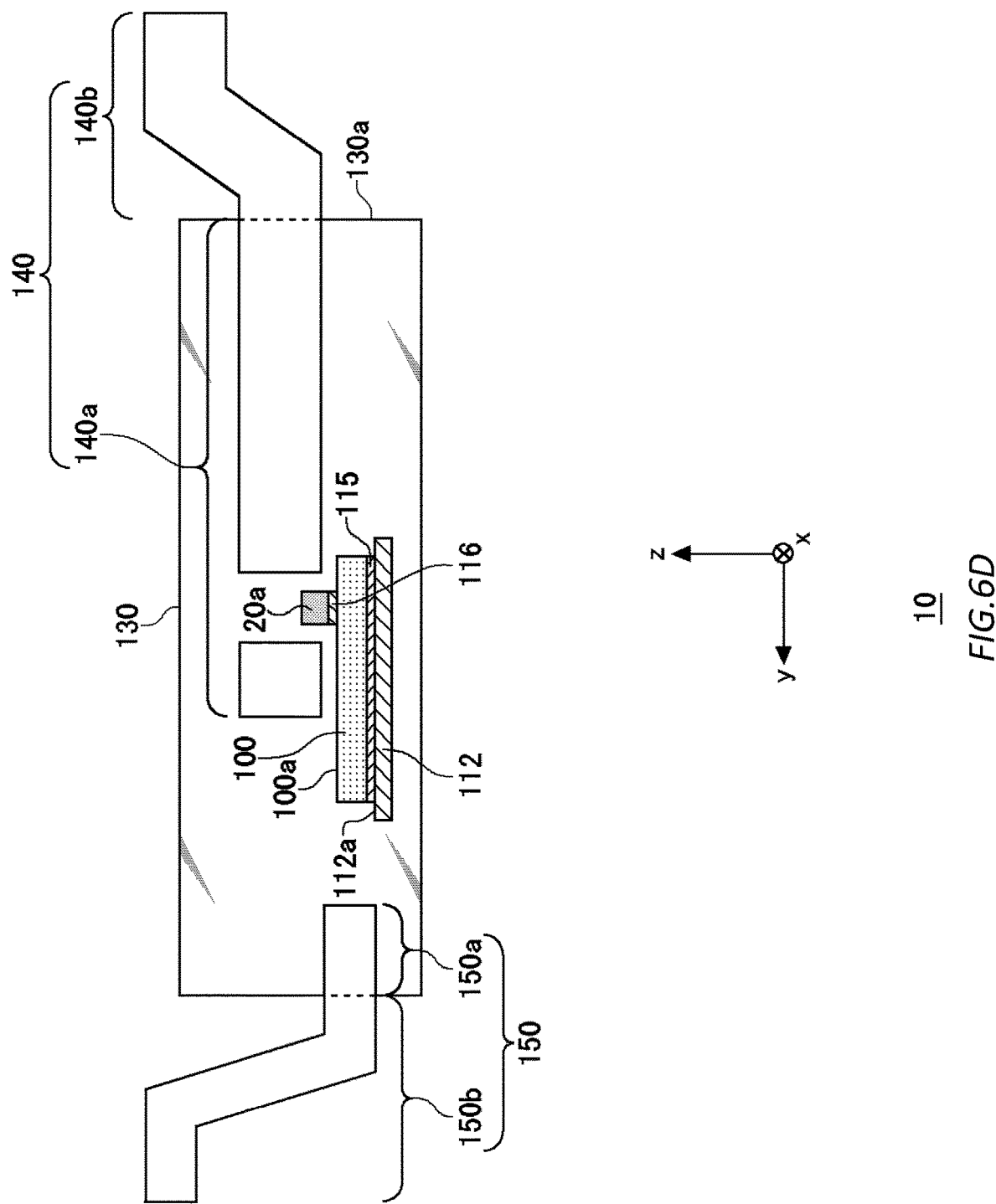

CURRENT SENSOR

The contents of the following patent application(s) are incorporated herein by reference:
NO. 2023-048261 filed in JP on Mar. 24, 2023
NO. 2024-042082 filed in JP on Mar. 18, 2024

BACKGROUND

1. Technical Field

The present invention relates to a current sensor.

2. Related Art

Patent Document 1, Patent Document 2, and Patent Document 3 disclose a current sensor having a magnetoelectric conversion element.

PRIOR ART DOCUMENTS

Patent Document

Patent Document 1: Japanese Patent No. 6415148
Patent Document 2: U.S. Pat. No. 6,995,315 specification
Patent Document 3: U.S. Pat. No. 11,385,301 specification

BRIEF DESCRIPTION OF THE DRAWINGS

FIG. 6D is a view for explaining the method of manufacturing the current sensor according to the second embodiment.

DESCRIPTION OF EXEMPLARY EMBODIMENTS

Figure 1A:
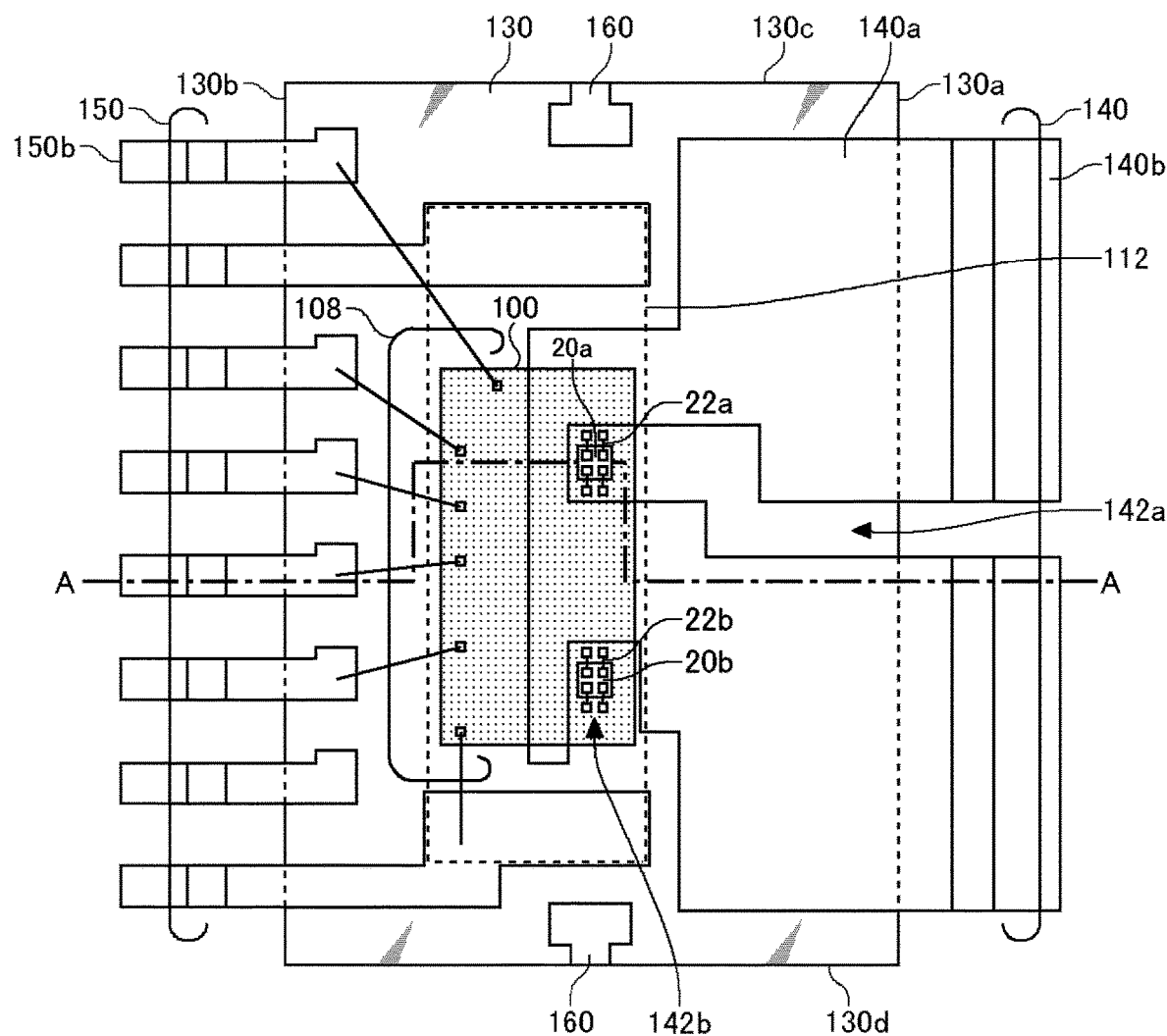
FIG. 1A is a schematic plan view of a current sensor according to a first embodiment as viewed from a ceiling surface side (Z axis direction).
Figure 1A:
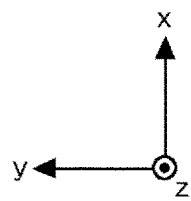

Hereinafter, embodiments of the present invention will be described. However, the following embodiments are not for limiting the invention according to the claims. In addition, not all of the combinations of features described in the embodiments are essential to the solution of the invention.

A current sensor includes a primary conductor through which a measurement current to be measured flows, a magnetoelectric conversion element which detects a magnetic field generated due to the measurement current, and a signal processing IC which amplifies a signal of the magnetoelectric conversion element and outputs the amplified signal to the outside, and the primary conductor, the magnetoelectric conversion element, and the signal processing IC are sealed with a mold resin to provide one semiconductor package.

For example, Patent Document 1 discloses a current sensor including a U-shaped primary conductor, a magnetoelectric conversion element arranged in an opening of the primary conductor, and a signal processing IC. The magnetoelectric conversion element and the signal processing IC are electrically connected via a wire arranged to straddle the primary conductor. According to the current sensor described in Patent Document 1, the magnetoelectric conversion element is surrounded by the U-shaped primary conductor, and thus a current can be sensed with high sensitivity. However, the current sensor of Patent Document 1 has a configuration in which the wire electrically connecting the magnetoelectric conversion element and the signal processing IC straddles the primary conductor. Thus, the wire tends to be long. Therefore, a large loop is formed in the wire, the magnetoelectric conversion element, and the signal processing IC, and the wire, the magnetoelectric conversion element, and the signal processing IC may be affected by noise caused by the measurement current flowing through the primary conductor.

According to the current sensor described in Patent Documents 2 and 3, the signal processing IC incorporates the magnetoelectric conversion element. With such a configuration, the current sensor is less likely to be affected by the noise caused by the measurement current flowing through the primary conductor, as compared with the current sensor described in Patent Document 1. However, since the magnetoelectric conversion element is not surrounded by the U-shaped primary conductor, the sensitivity for sensing current is lower than that of the current sensor described in Patent Document 1. In addition, according to the current sensor described in Patent Document 2, the primary conductor and a terminal are configured separately, and thus an electrical resistance increases at an interface between the primary conductor and the terminal, and when current flows through the primary conductor, heat generation is likely to occur at the interface. Further, peeling or the like due to a thermal expansion difference or an absorption expansion difference may occur among an adhesive which connect members, a conductor, and a mold resin.

In recent years, it has been considered that the current sensor as described above is also used for applications such as electric vehicles. The current sensor used in electric vehicles or the like is required to respond faster. When the wire electrically connecting the magnetoelectric conversion element and the signal processing IC is long as described above, deformation of the wire is likely to occur, the shape of the wire is not easily optimized, and electrical characteristics such as responsiveness may be deteriorated.

In this regard, in each of the following embodiments, provided is a current sensor capable of suppressing deterioration in electrical characteristics such as responsiveness while suppressing a decrease in sensitivity for sensing current.

Figure 1B:
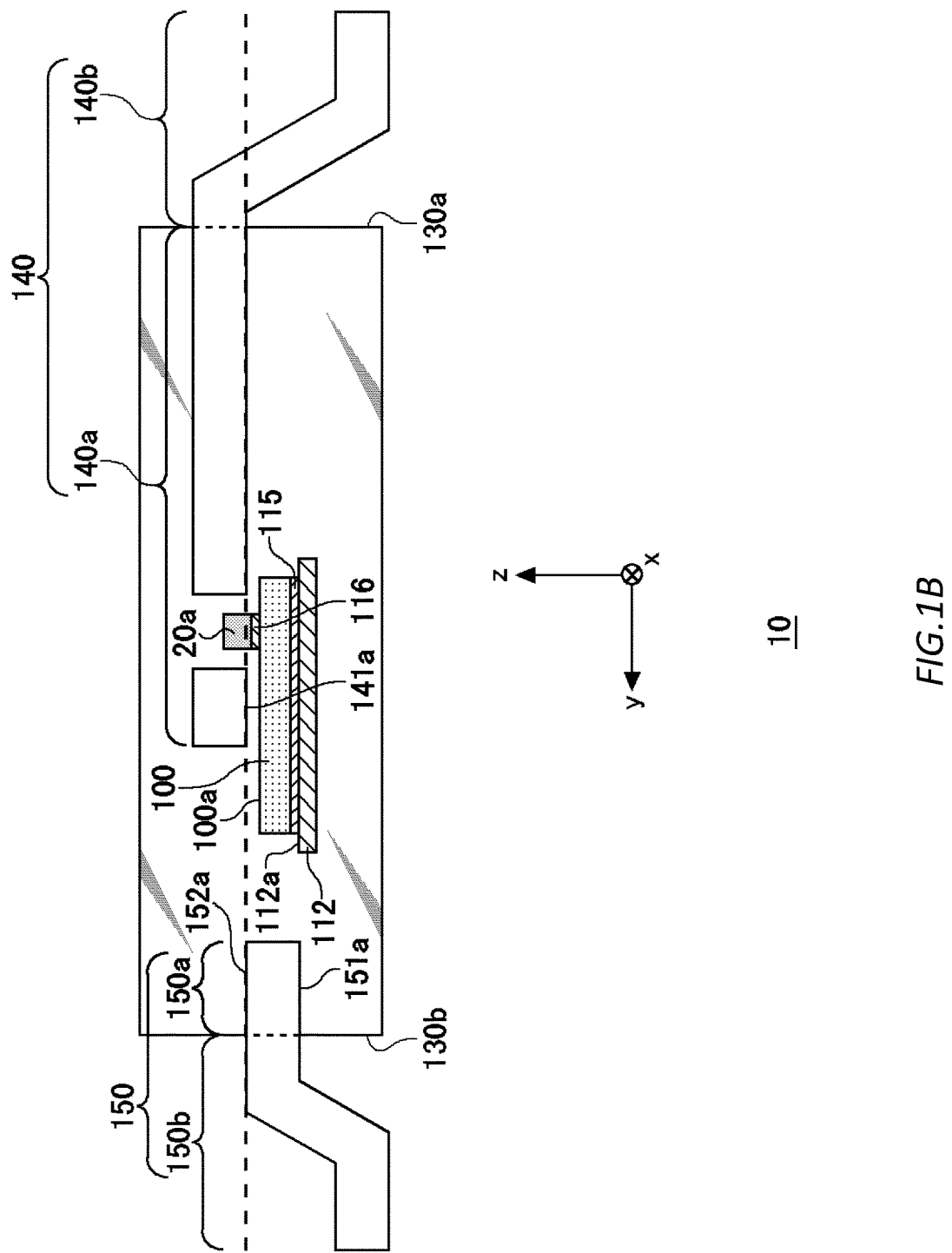
FIG. 1B is an A-A line sectional view of the current sensor shown in FIG. 1A.

FIG. 1A and FIG. 1B show the internal configuration of a semiconductor package which functions as a current sensor 10 according to the first embodiment. FIG. 1A is a schematic plan view of the current sensor 10 according to the first embodiment as viewed from the ceiling surface side (in a Z axis direction). FIG. 1B is an A-A line sectional view of the current sensor 10 shown in FIG. 1A.

For the coordinates, in FIG. 1A, an X axis direction is defined as a direction from bottom to top and parallel to the document, a Y axis direction is defined as a direction from right to left and parallel to the document, and a Z axis direction is defined as a direction from back to front and perpendicular to the document. Any one axis among an X axis, a Y axis, and a Z axis is orthogonal to another axis.

The current sensor 10 includes a signal processing IC 100, a magnetoelectric conversion element 20a, a magnetoelectric conversion element 20b, an IC support portion 112, a lead frame 140 on a primary side, a lead frame 150 on a secondary side, a suspending pin 160, and a sealing portion 130.

The lead frame 140 includes a conductor 140a and a pair of lead terminals 140b. The conductor 140a is sealed in the sealing portion 130, and a measurement current flows therethrough. The conductor 140a may at least partially surround the magnetoelectric conversion element 20a and the magnetoelectric conversion element 20b. The pair of lead terminals 140b are configured to be physically integrated with the conductor 140a and are exposed to the outside of the sealing portion 130. The lead frame 150 includes a conductor 150a and a plurality of lead terminals 150b. The conductor 150a is sealed in the sealing portion 130 and supports the IC support portion 112. The plurality of lead terminals 150b are configured to be physically integrated with the conductor 150a and are exposed to the outside of the sealing portion 130. The lead frame 150 is an example of a first lead frame. The plurality of lead terminals 150b are examples of a first terminal portion.

In addition, as shown in FIG. 1B, a surface 152a of the conductor 150a of the lead frame 150 (a surface on the ceiling side of the current sensor 10) opposing to a surface 151a supporting the IC support portion 112 and a surface 141a of the conductor 140a of the lead frame 140 facing the signal processing IC 100 may be positioned at substantially the same height in a thickness direction. In the current sensor 10 in the first embodiment, the lead frame 140 and the lead frame 150 have the same thickness. However, the lead frame 140 and the lead frame 150 do not necessarily have the same thickness.

The magnetoelectric conversion elements 20a and 20b are electrically connected to the signal processing IC 100 via wires 22a and 22b. The magnetoelectric conversion elements 20a and 20b are configured separately from the signal processing IC 100, and output a signal processed by the signal processing IC 100 to the signal processing IC 100. The signal processing IC 100 is electrically connected to the plurality of lead terminals 150b via a wire 108. The wires 22a and 22b and the wire 108 may be formed of a conductor material containing Au, Ag, Cu, or Al as a main component.

The sealing portion 130 seals the magnetoelectric conversion elements 20a and 20b, the conductor 140a, the conductor 150a, the signal processing IC 100, the IC support portion 112, the wires 22a and 22b, and the wire 108 with a mold resin. The mold resin may be, for example, constituted by an epoxy-based thermosetting resin added with silica and formed into a semiconductor package by transfer molding.

The magnetoelectric conversion elements 20a and 20b detect a magnetic field in a specific direction that changes according to the measurement current flowing through the conductor 140a, and the signal processing IC 100 amplifies a signal corresponding to the magnitude of the magnetic field and outputs the amplified signal via the lead terminal 150b. The magnetoelectric conversion elements 20a and 20b are composed of a compound semiconductor formed on a GaAs substrate, and may be chips cut out in a square or rectangular shape in a plan view from the Z axis direction. The magnetoelectric conversion elements 20a and 20b may include a substrate constituted by a silicon or compound semiconductor, and a magnetoelectric conversion unit provided on the substrate. The thickness of the substrate is adjusted by grinding a surface on the negative side in the Z axis direction. Since the magnetic field in the Z axis direction is detected, Hall elements are suitable as the magnetoelectric conversion elements 20a and 20b. In addition, in a case where the magnetoelectric conversion elements 20a and 20b are arranged at positions where a magnetic field in any one axial direction on an XY plane is detected, for example, when the magnetoelectric conversion elements are arranged at positions where a magnetic field in the X axis direction is detected, magnetoresistive elements or flux gate elements are suitable as the magnetoelectric conversion elements 20a and 20b.

When the Hall elements are used as the magnetoelectric conversion elements 20a and 20b, it is preferable that the magnetoelectric conversion elements 20a and 20b are at least partially surrounded by the conductor 140a in the lead frame 140 in the plan view. When the magnetoresistive elements or the flux gate elements are used as the magnetoelectric conversion elements 20a and 20b, it is preferable that the magnetoelectric conversion elements 20a and 20b are positioned to overlap at least a part of the conductor 140a in the lead frame 140 in the plan view, that is, in the Z axis direction.

The magnetoelectric conversion elements 20a and 20b detect a magnetic field in a specific direction that changes according to the measurement current flowing through the conductor 140a, and the signal processing IC 100 amplifies a signal corresponding to the magnitude of the magnetic field and outputs the amplified signal via the lead terminal 150b.

The signal processing IC 100 is a Large-scale Integration circuit (LSI). The signal processing IC 100 is a signal processing circuit composed of an Si monolithic semiconductor formed on an Si substrate. The signal processing circuit processes output signals corresponding to the magnitudes of the magnetic field output from the magnetoelectric conversion elements 20*a* and 20*b*. The signal processing circuit corrects the measurement current flowing through the conductor 140*a* based on the output signals, and outputs, via the lead terminal 150*b*, an output signal indicating an accurate current value. The signal processing circuit reduces a noise component included in the output signal of the magnetoelectric conversion element 20*a* and the output signal of the magnetoelectric conversion element 20*b*, based on a difference between the output signal of the magnetoelectric conversion element 20*a* and the output signal of the magnetoelectric conversion element 20*b*, amplifies the output signal of the magnetoelectric conversion element 20*a* and the output signal of the magnetoelectric conversion element 20*b* in which the noise component is reduced, calculates the current value of the measurement current based on the amplified output signal, and outputs the output signal indicating the current value.

In the first embodiment, an example is described in which the current sensor 10 includes two magnetoelectric conversion elements 20*a* and 20*b*. However, it is sufficient if the current sensor 10 includes one or more magnetoelectric conversion elements.

The conductor 140*a* is formed in a U shape in the plan view, at least partially surrounds the magnetoelectric conversion elements 20*a* and 20*b* in the plan view, and the measurement current to be measured by the magnetoelectric conversion elements 20*a* and 20*b* flows therethrough. The conductor 140*a* has a slit 142*a* and a slit 142*b*. The slit 142*a* extends along the Y axis direction. The slit 142*b* extends along the X axis direction. A direction in which the slit 142*a* and the slit 142*b* extend is not limited to the above. For example, the slit 142*b* may also extend along the Y axis direction. The magnetoelectric conversion element 20*a* is arranged in the slit 142*a*, and the magnetoelectric conversion element 20*b* is arranged in the slit 142*b* so as to be at least partially surrounded by the conductor 140*a*. The conductor 140*a* of the lead frame 140 is electrically insulated from the magnetoelectric conversion elements 20*a* and 20*b* and the signal processing IC 100 by the sealing portion 130.

The measurement current flowing through the conductor 140*a* flows from one end to the other end of the U shape. Accordingly, the magnetic field corresponding to the magnitude of the measurement current and a distance from the conductor 140*a* is generated around the conductor 140*a*. At the positions where the magnetoelectric conversion elements 20*a* and 20*b* are arranged, a magnetic field the Z-axis component of which is the largest is generated. Since the magnetoelectric conversion elements 20*a* and 20*b* are arranged in the slits 142*a* and 142*b*, high sensitivity to the measurement current can be obtained.

The pair of lead terminals 140*b* and the plurality of lead terminals 150*b* are arranged to face each other via the signal processing IC 100 in a direction (Y axis direction) intersecting the thickness direction (Z axis direction) of the signal processing IC 100. The pair of lead terminals 140*b* is exposed from a side surface 130*a* of the sealing portion 130. The plurality of lead terminals 150*b* are exposed from a side surface 130*b* opposite to the side surface 130*a* of the sealing portion 130. The pair of lead terminals 140*b* and the plurality of lead terminals 150*b* may protrude outward from heights of the side surface 130*a* and the side surface 130*b*, which oppose to each other, of the sealing portion 130, the heights being different from each other in the thickness direction of the sealing portion 130. The pair of lead terminals 140*b* and the plurality of lead terminals 150*b* may protrude outward from the side surfaces 130*a* and 130*b*, which oppose to each other, of the sealing portion 130, and the surface of the lead terminal 150*b* on the same side as a surface 100*a* of the signal processing IC 100 may have the same height in the thickness direction (Z axis direction) of the sealing portion 130 as that of the surface of the lead terminal 140*b* (the same surface as the surface 141*a*) on the same side as the surface on the side opposite to the surface 100*a* of the signal processing IC, or the surface of the lead terminal 150*b* on the same side as the surface 100*a* of the signal processing IC 100 may be positioned below the surface of the lead terminal 140*b* on the same side as the surface 100*a* of the signal processing IC 100 in the thickness direction of the sealing portion 130. The pair of lead terminals 140*b* protrude outward from a height of the current sensor 10 on the ceiling surface side with respect to the plurality of terminals 150*b*. The pair of lead terminals 140*b* protrude from the side surface 130*a* to a negative side in the Y axis direction, and is further bent to the negative side in the Z axis direction. The plurality of terminals 150*b* protrude from the side surface 130*b* to a positive side in the Y axis direction, and are further bent toward to negative side in the Z axis direction.

In the first embodiment, in the side surfaces 130*a* and 130*b*, which oppose to each other, of the sealing portion 130, the surface of the lead terminal 150*b* on the same side as the surface 100*a* of the signal processing IC 100 preferably has the same height in the thickness direction (Z axis direction) of the sealing portion 130 as that of the surface of the lead terminal 140*b* (the same surface as the surface 141*a*) on the same side as the surface on the side opposite to the surface 100*a* of the signal processing IC 100. In the side surfaces 130*a* and 130*b*, which face each other, of the sealing portion 130, when the surface of the lead terminal 150*b* on the same side as the surface 100*a* of the signal processing IC 100 and the surface of the lead terminal 140*b* (the same surface as the surface 141*a*) on the same side as the surface on the side opposite to the surface 100*a* of the signal processing IC 100 have portions having the same height, the surface of the lead terminal 150*b* on the same side as the surface 100*a* of the signal processing IC 100 and the surface of the lead terminal 140*b* (the same surface as the surface 141*a*) on the same side as the surface on the side opposite to the surface 100*a* of the signal processing IC 100 may be regarded to have the same height in the thickness direction (Z axis direction) of the sealing portion 130.

Since the surface of the lead terminal 150*b* on the same side as the surface 100*a* of the signal processing IC 100 has the above relationship with the surface of the lead terminal 140*b* (the same surface as the surface 141*a*) on the same side as the surface on the side opposite to the surface 100*a* of the signal processing IC 100, it is possible to realize the structure of the first embodiment without a portion bent in the thickness direction with respect to the conductor 140 or the lead frame 150 in advance before sealing, and it is easy to improve height accuracy.

A part of the suspending pin 160 is exposed from each of a side surface 130*c* and a side surface 130*d*, which oppose to each other in the X axis direction, different from the side surface 130*a* and the side surface 130*b* of the sealing portion 130. The suspending pin 160 is a metal member for supporting a semiconductor package to the lead frame 150 in a manufacturing phase. The suspending pin 160 is a lead for supporting the sealing portion 130, which is a molded mold resin, throughout an assembly process.

The plurality of lead terminals 150b are metal members electrically connected to the signal processing IC 100, and the suspending pin 160 is a metal member not electrically connected to the signal processing IC 100. The suspending pin 160 is separate from the plurality of lead terminals 150b. The conductor 150a, the plurality of lead terminals 150b, and the suspending pin 160 may be made of a conductor material containing copper as a main component together with the conductor 140a and the pair of lead terminals 140b. The conductor 150a, the plurality of lead terminals 150b, and the suspending pin 160 are separated from the conductor 140a and are electrically insulated from the conductor 140a.

The IC support portion 112 is a plate-like member, and supports the signal processing IC 100, which is electrically connected to the lead frame 150, on a surface 112a on the ceiling surface side of the current sensor 10. The IC support portion 112 is an example of a first support portion. The conductor 150a of the lead frame 150 supports the IC support portion 112. The surface 112a is an example of a first surface of the first support portion. The signal processing IC 100 may be adhered to the surface 112a of the IC support portion 112 via an adhesive layer 115. The adhesive layer 115 may be a die attach film. The IC support portion 112 may be supported by the suspending pin 160 in addition to the conductor 150a of the lead frame 150. That is, the conductor 150a of the lead frame 150 and the suspending pin 160 may support the IC support portion 112.

The IC support portion 112 supports the conductor 150a and the signal processing IC 100 on the same surface of the surface 112a. Accordingly, the circuit surface of the signal processing IC 100 can suppress the amount of protrusion from the surface 152a of the conductor 150a on the side opposite to the surface 151a facing the surface 112a, and processing in the thickness direction of the conductor 140a can be reduced. Both the conductor 140a and the conductor 150a do not need to be subjected to bending such as forming, which generally is relatively poor in dimensional accuracy in a step direction, and may be semi-punched, crushed, or unprocessed. Thus, the accuracy of the positional relationship among the conductor 140a, the conductor 150a, and the magnetoelectric conversion elements 20a and 20b in the height direction (Z axis direction) can be secured, and the accuracy of current detection of the current sensor 10 can be improved. In addition, a distance between the signal processing IC 100 and the conductor 140a needs to secure an interval in consideration of variations in height, and when this interval is large, the magnetic-sensitive surfaces of the magnetoelectric conversion elements 20a and 20b are lowered from the center of the conductor 140a, so that the sensitivity cannot be increased. Specifically, when forming is used, a total interval of 0.22 mm needs to be secured by adding each of a distance of 0.02 mm in consideration of variations in the thickness of the signal processing IC and a thickness of 0.1 mm of a sealing resin for securing a withstand voltage, to a variation of 0.1 mm in the position of the height of the conductor 150a of the lead frame 150. By not performing forming, the distance between the signal processing IC 100 and the conductor 140a can be smaller than 0.22 mm. In addition, a space for providing a step for separating the circuit surface of the signal processing IC 100 and the conductor 140a in the thickness direction by forming the conductor 140a or the conductor 150a is unnecessary, and package design is facilitated. For example, when the thicknesses of the primary conductor and the secondary conductor are greatly different from each other as in Patent Document 3 (U.S. Pat. No. 1,138,530), it is difficult to form the lead terminal. In this regard, when the secondary conductor is also thickened, a large space at least twice the plate thickness is required for forming to provide the step. On the other hand, by providing the IC support portion 112 and supporting the surface 112a of the IC support portion 112 on the surface 151a of the conductor 150a, the step for separating the circuit surface of the signal processing IC and the conductor 140a in the thickness direction can be provided without forming the conductor 140a or the conductor 150a.

The IC support portion 112 may be made of a material different from that of the lead frame 150. The IC support portion 112 may be constituted by an insulator or a semiconductor. The IC support portion 112 may be made of polyimide or silicon. Accordingly, an eddy current generated by the current flowing through the conductor 140a can be suppressed, so that noise is not added to the magnetoelectric conversion elements 20a and 20b, and a high-speed response can be realized.

The IC support portion 112 may be made of metal. Accordingly, heat dissipation can be improved.

In addition, since the periphery of the conductor 140a is covered with the mold resin, discharge along the interface does not occur between the conductor 140a and the circuit surface of the signal processing IC.

The magnetoelectric conversion elements 20a and 20b are mounted on the surface 100a on the side opposite to the surface supported by the IC support portion 112 of the signal processing IC. The magnetoelectric conversion elements 20a and 20b may be adhered to the surface 100a of the signal processing IC 100 via an adhesive layer 116. The adhesive layer 116 may be a die attach film. In addition, the lead frame 140 is arranged such that at least a part thereof faces the surface 100a of the signal processing IC 100.

The magnetoelectric conversion elements 20a and 20b and the signal processing IC 100 are electrically connected via a conductor such as a wire.

Figure 3:
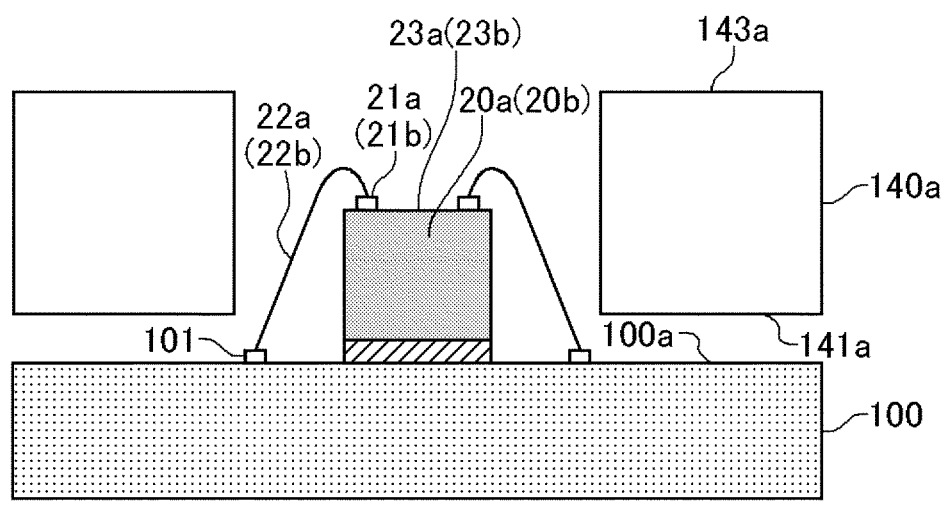
FIG. 3 shows an example in which a magnetoelectric conversion element is electrically connected to a signal processing IC by wire bonding.

FIG. 3 shows an example in which the magnetoelectric conversion elements 20a and 20b are electrically connected to the signal processing IC 100 by wire bonding. The signal processing IC 100 has a pad 101 on the surface 100a. The magnetoelectric conversion elements 20a and 20b include pads 21a and 21b on surfaces 23a and 23b on the side opposite to the surface facing the signal processing IC 100. The pad 101 is an example of a first pad. The pads 21a and 21b are examples of a second pad. Wires 22a and 22b electrically connect the pad 101 and the pads 21a and 21b. In the plan view, an apex P of the curved portion of each of the wires 22a and 22b may exist at a position closer to the center of each of the magnetoelectric conversion elements 20a and 20b than the wall surface surrounding the magnetoelectric conversion elements 20a and 20b of the conductor 140a.

Since the magnetoelectric conversion elements 20a and 20b are mounted on the surface 100a of the signal processing IC 100 in a state of being surrounded by the conductor 140a of the lead frame 140, the magnetoelectric conversion elements 20a and 20b and the signal processing IC 100 can be electrically connected by the wires 22a and 22b without straddling the conductor 140a. Thus, the deformation of the wires 22a and 22b hardly occurs, the shapes of the wires 22a and 22b are relatively easily optimized, and the deterioration of electrical characteristics such as responsiveness of the current sensor 10 can be suppressed.

The surfaces 23a and 23b, which are the magnetic-sensitive surfaces of the magnetoelectric conversion elements 20a and 20b, are surrounded by the conductor 140a through which a measurement current flows. That is, the surfaces 23a and 23b, which are the magnetic-sensitive surfaces of the magnetoelectric conversion elements 20a and 20b, are positioned between the surface 141a of the conductor 140a facing the signal processing IC 100 and the surface 143a opposing to the surface 141a when viewed from the direction along the surfaces 23a and 23b. Accordingly, the current can be detected with higher sensitivity than in a case where the magnetoelectric conversion elements 20a and 20b are incorporated in the signal processing IC 100. In addition, the conductor 140a constitutes the lead frame 140 integrally with the pair of lead terminals 140b. Therefore, an electrical resistance increases at the interfaces of the joining portions between the conductor 140a and the pair of lead terminals 140b, and heat generation does not easily occur at the interface due to the flow of the measurement current.

Figure 2:
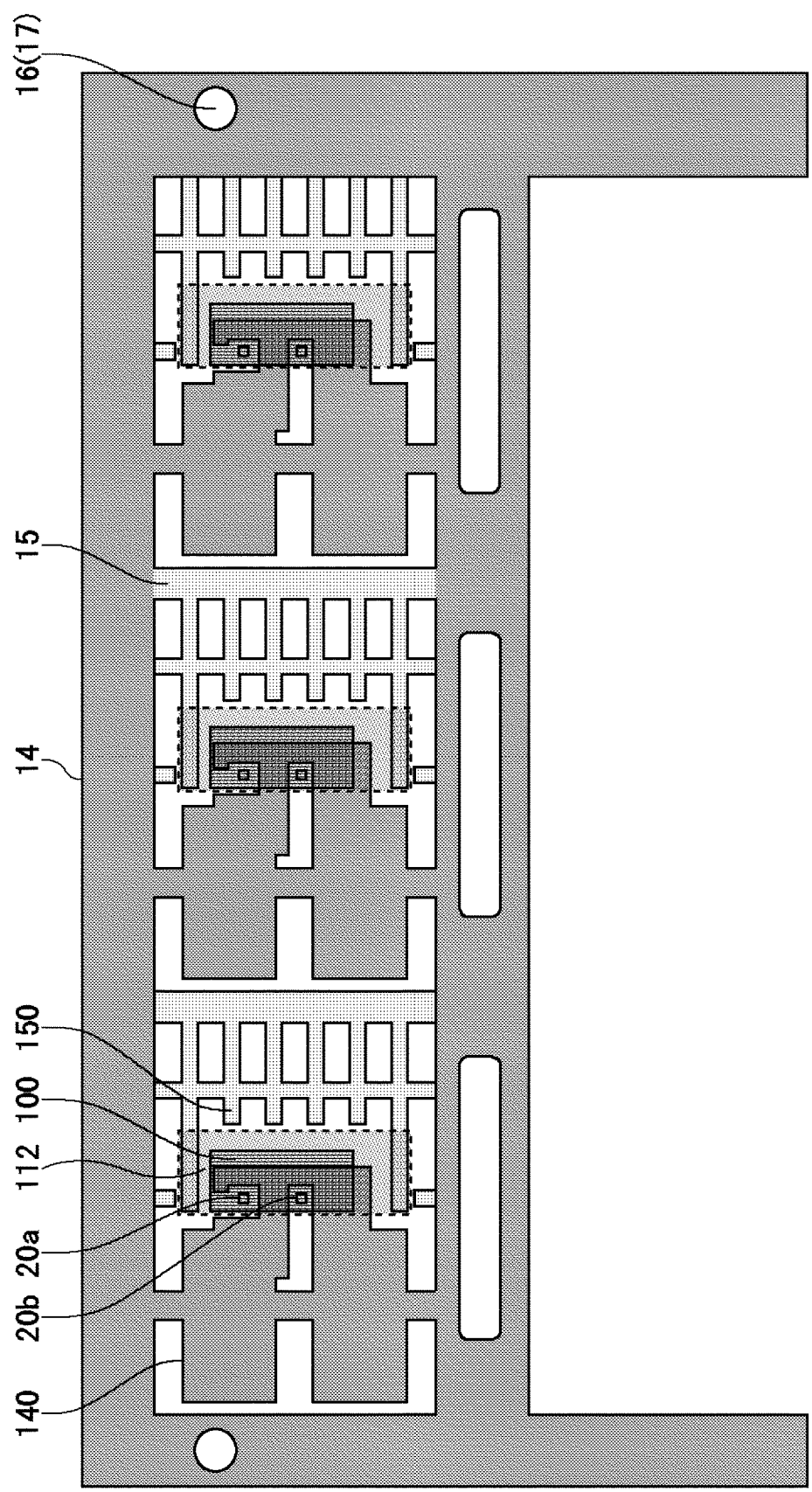
FIG. 2 shows a state in which thin metal plates constituting a lead frame are stacked.

The lead frame 140 and the lead frame 150 are configured separately, and may be constituted by different lead frames (thin metal plates) even in a manufacturing phase. That is, as shown in FIG. 2, the thin metal plate 14 constituting the plurality of lead frames 140 may be stacked on a surface of the thin metal plate 15, which constitutes the plurality of lead frames 150, on the side opposite to the surface supporting the IC support portion 112. The thin metal plate 14 and the thin metal plate 15 include alignment holes 16 and 17, respectively. Since the thin metal plate 14 and the thin metal plate 15 can be accurately aligned via the alignment holes 16 and 17, it is possible to suppress a deviation in the positional relationship between the lead frame 140 and the lead frame 150. Therefore, an extra space portion in consideration of a positional deviation in the case of carving a mold for sealing the thin metal plate 14 and the thin metal plate 15 can be reduced, and burrs of the sealing resin to be removed in the assembly process can be reduced.

Here, in a state where the thin metal plate 14 and the thin metal plate 15 are accurately aligned via the alignment holes 16 and 17, the thin metal plate 14 and the thin metal plate 15 are adhered by using an adhesive or sealed in a sealing mold without using an adhesive. If a mechanical method such as caulking is used for joining the thin metal plate 14 and the thin metal plate 15, a interval between a protrusion and a hole used for joining is required, and in addition, distortion caused by stress of the joint portion occurs. Therefore, in addition to the method of using the alignment holes 16 and 17, it is necessary to allow a positional variation of about 0.05 mm. Thus, in the case of using the mechanical method, the positional variation of 0.05 mm due to the distortion of the lead frame is added to a simple integrated tolerance of 0.12 mm of the variation in the position of the lead frame 140 and the lead frame 150 and the variation in the position of the bonding or the like of the signal processing IC 100, and thus, it is necessary to allow a variation of 0.17 mm. When a filler contained in the sealing resin sufficiently enters and a resin thickness of 0.1 mm capable of securing a withstand voltage is secured, it is necessary to secure a distance of 0.27 mm or more in a planar direction between the pad 101 provided in the signal processing IC 100 and the lead frame 140. In this case, a distance between the magnetoelectric conversion element and the primary conductor is larger than that in the structure as in Patent Document 1, so that the sensitivity cannot be increased. In addition, since the mechanical method such as caulking requires a large area for joining, the number of leads taken per lead frame is reduced, leading to an increase in cost.

Figure 4:
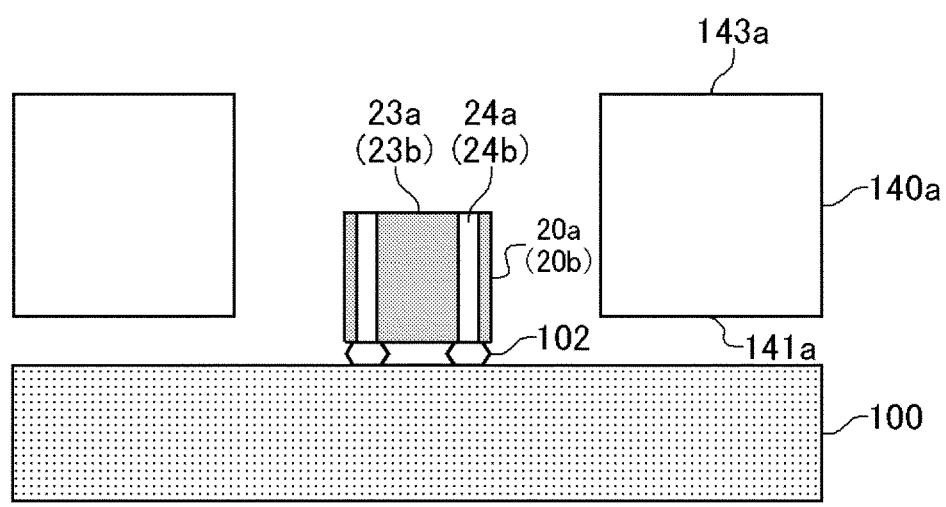
FIG. 4 shows an example in which the magnetoelectric conversion element is electrically connected to the signal processing IC by soldering via a through hole.

FIG. 4 shows an example in which the magnetoelectric conversion elements 20a and 20b are electrically connected to the signal processing IC 100 by soldering via through holes. The through hole refers to a penetration hole provided in the substrate and filled with a conductive material, and electrical connection can be made at both ends of the penetration hole. Therefore, the through holes in FIG. 4 pass through the inside of the magnetoelectric conversion elements 20a and 20b, and the magnetoelectric conversion elements 20a and 20b and the signal processing IC 100 are electrically connected via the through holes. Even in the connection configuration as shown in FIG. 4, the surfaces 23a and 23b, which are magnetic-sensitive surfaces of the magnetoelectric conversion elements 20a and 20b, are surrounded by the conductor 140a through which the measurement current flows. That is, the surfaces 23a and 23b, which are the magnetic-sensitive surfaces of the magnetoelectric conversion elements 20a and 20b, are positioned between the surface 141a of the conductor 140a facing the signal processing IC 100 and the surface 143a opposing to the surface 141a when viewed from the direction along the surfaces 23a and 23b. Accordingly, the current can be detected with higher sensitivity than in a case where the magnetoelectric conversion elements 20a and 20b are incorporated in the signal processing IC 100.

Figure 5A:
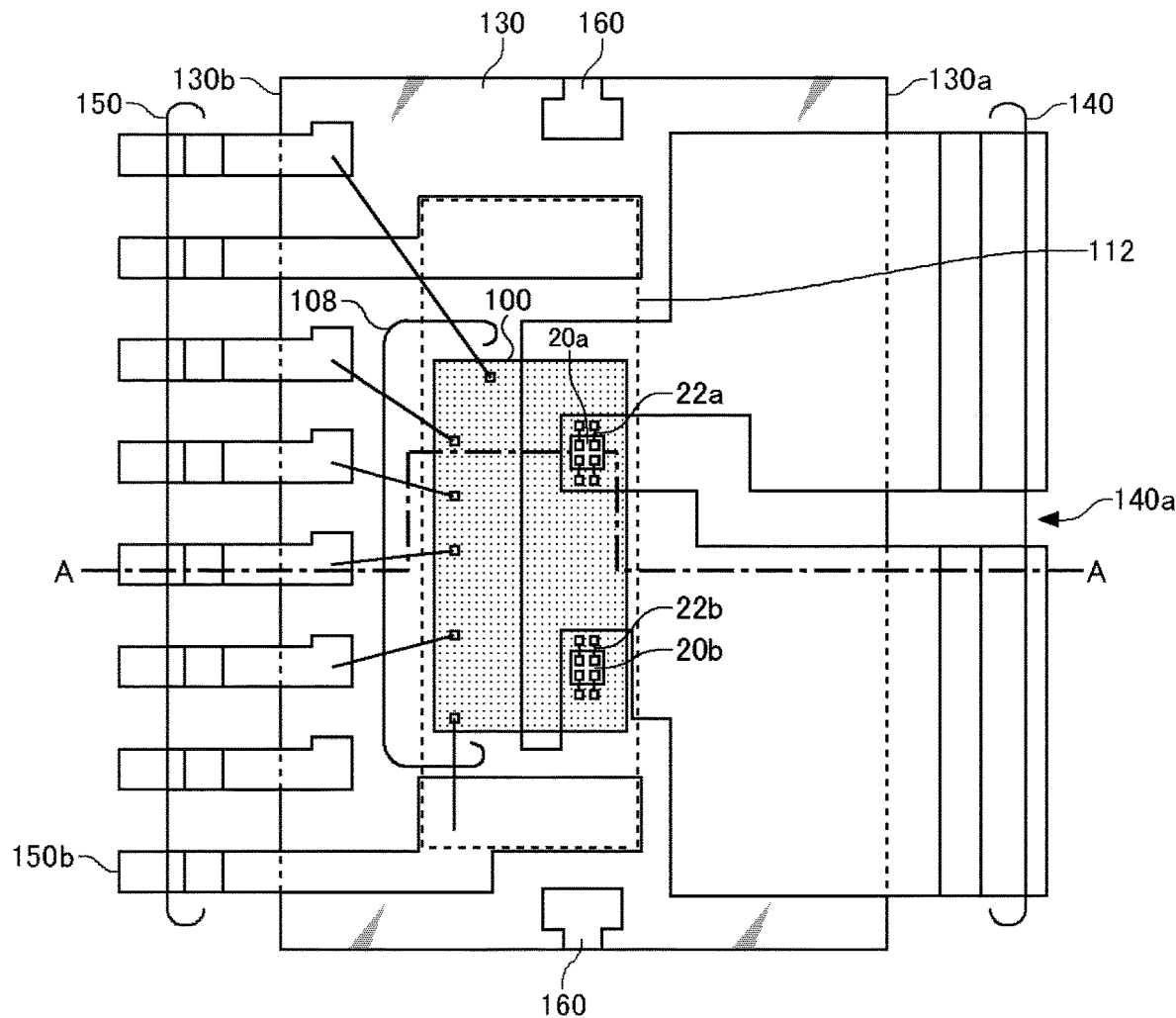
FIG. 5A is a schematic plan view of a current sensor according to a second embodiment as viewed from the ceiling surface side (Z axis direction).
Figure 5A:
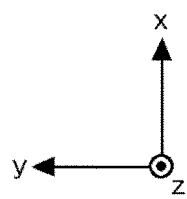
Figure 5B:
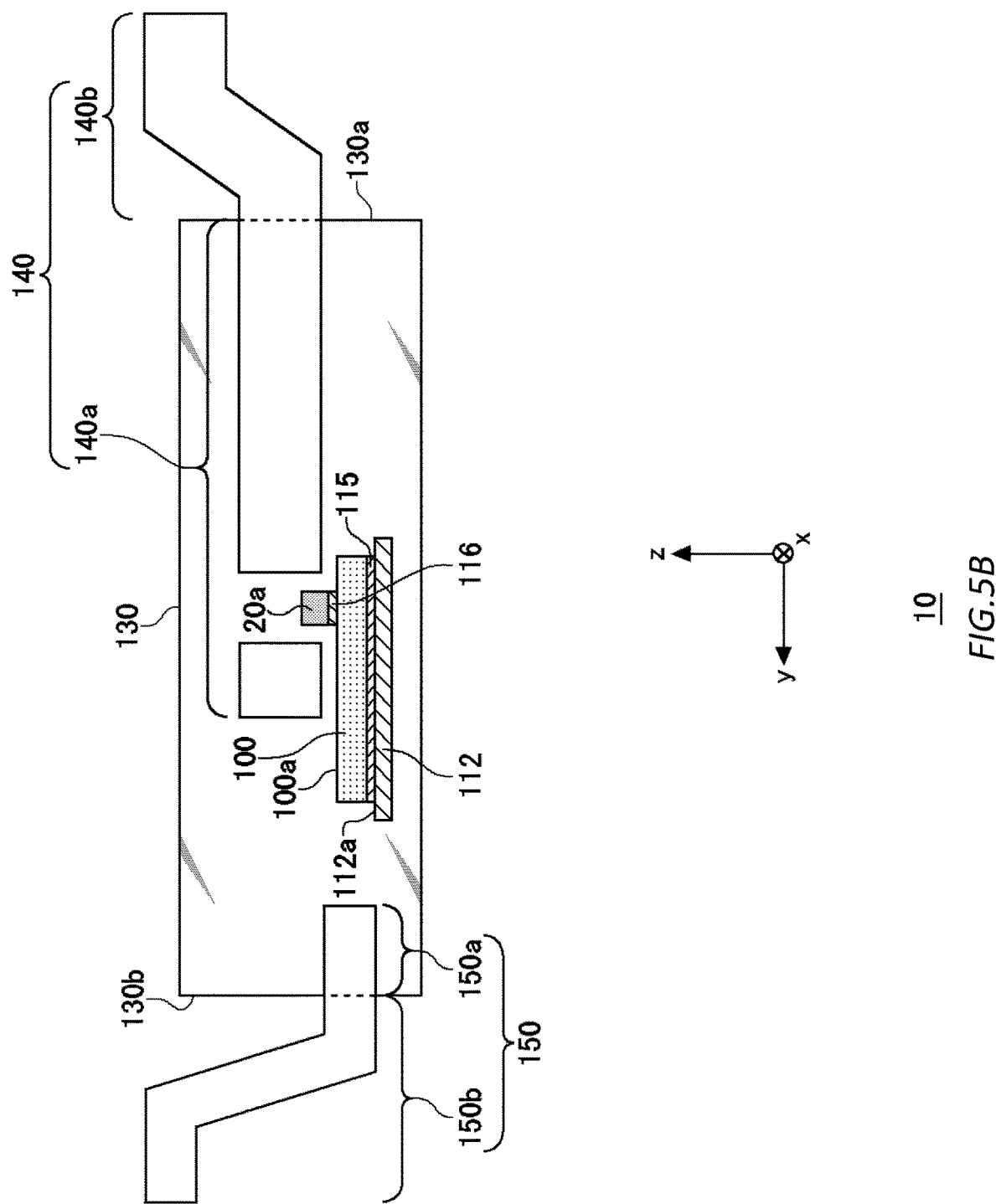
FIG. 5B is an A-A line sectional view of the current sensor 10 shown in FIG. 5A.

FIGS. 5A and 5B show an internal configuration of a semiconductor package which functions as the current sensor 10 according to a second embodiment. FIG. 5A is a schematic plan view of the current sensor 10 according to the second embodiment as viewed from the ceiling surface side (Z axis direction). FIG. 5B is an A-A line sectional view of the current sensor 10 shown in FIG. 5A.

Also in the second embodiment, in the side surfaces 130a and 130b, which oppose to each other, of the sealing portion 130, the surface of the lead terminal 150b on the same side as the surface 100a of the signal processing IC 100 may have the same height in the thickness direction (Z axis direction) of the sealing portion 130 as that of the surface of the lead terminal 140b on the same side as the surface on the side opposite to the surface 100a of the signal processing IC 100. The current sensor 10 according to the second embodiment is different from the current sensor 10 according to the first embodiment in which the lead frame 140 and the lead frame 150 have the same thickness in that the lead frame 140 is thicker than the lead frame 150. In addition, further, the current sensor 10 is different from the current sensor 10 according to the first embodiment in which the bending directions of the pair of lead terminals 140b of the lead frame 140 and the plurality of lead terminals 150b of the lead frame 150 are the negative side in the Z axis direction in that the bending directions are the positive side in the Z axis direction.

Since the lead frame 140 is thicker than the lead frame 150, the heat generation due to measurement current flowing through the lead frame 140 can be suppressed. In addition, the lead frame 140 and the lead frame 150 may be made of different materials. For example, the lead frame 140 may be made of a thick and soft material, for example, a material close to pure copper such as phosphorus-deoxidized copper. On the other hand, the lead frame 150 may be made of a thin and hard material, for example, copper doped with impurities.

By setting the bending directions of the lead terminal 140b and the lead terminal 150b to the positive side in the Z axis direction, the forming amount of the lead terminal 140b thicker than the lead terminal 150b can be reduced, and processing can be easily performed.

The signal processing IC 100 is thinner than the lead frame 150. Accordingly, it is possible to prevent the surface 100a, which is the circuit surface of the signal processing IC 100, from coming into contact with the lead frame 140.

FIGS. 6A to 6D are views for describing a method of manufacturing the current sensor 10 according to the second embodiment.

Figure 6A:
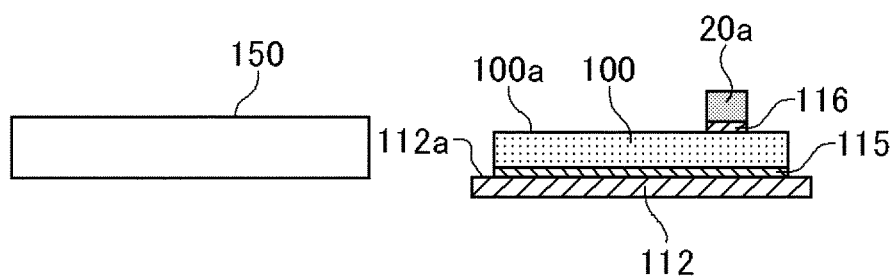
FIG. 6A is a view for explaining a method of manufacturing a current sensor according to a second embodiment.
Figure 6A:
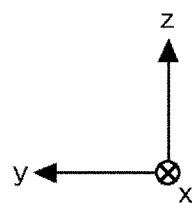

As shown in FIG. 6A, the surface 112a of the IC support portion 112 is adhered to the lead frame 150, and the signal processing IC 100 is further adhered onto the surface 112a of the IC support portion 112 via the adhesive layer 115. Further, the magnetoelectric conversion elements 20a and 20b are adhered onto the surface 100a of the signal processing IC 100 via the adhesive layer 116. The signal processing IC 100 and the magnetoelectric conversion elements 20a and 20b are electrically connected by wire bonding (wires are not shown).

A plurality of the sensor units assembled in this manner are arranged at predetermined positions of the mold in the state of being mounted on the thin metal plate 15.

Figure 6B:
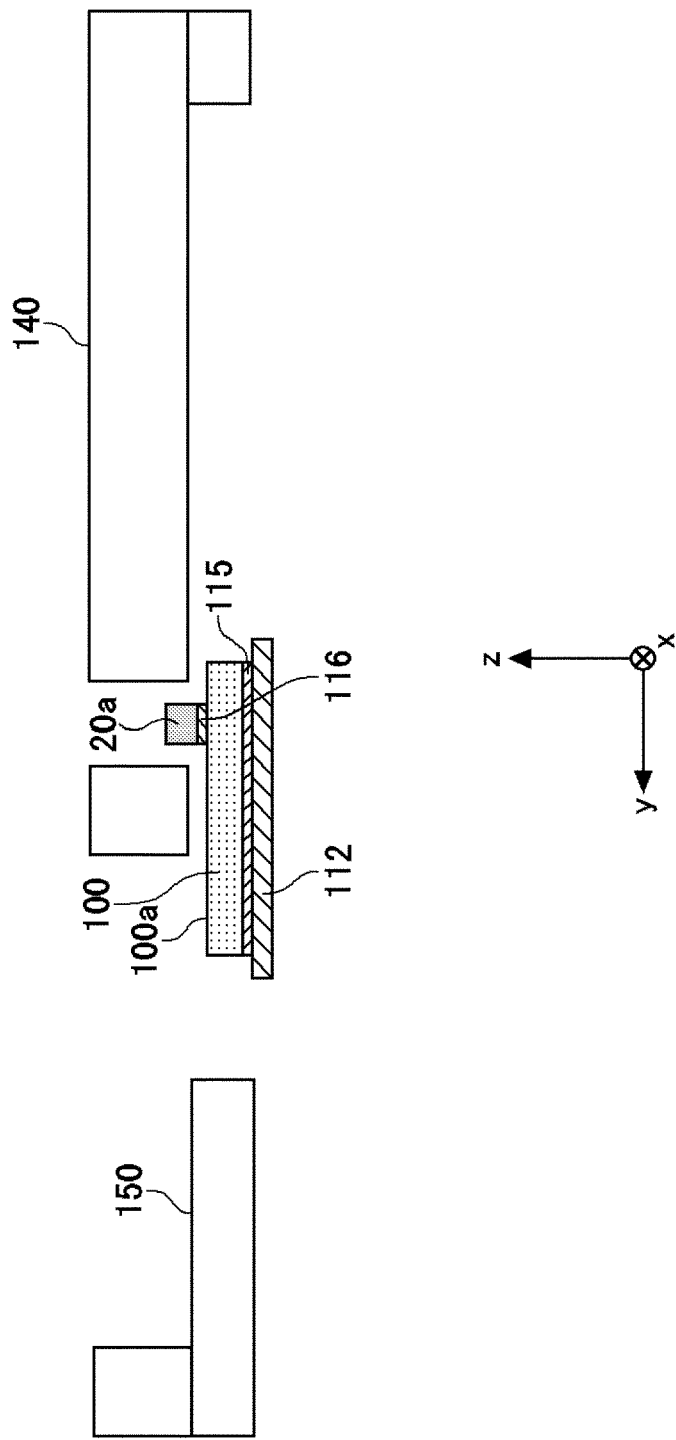
FIG. 6B is a view for explaining the method of manufacturing the current sensor according to the second embodiment.

Next, as shown in FIG. 6B, the lead frame 140 is arranged above the lead frame 150 so as to face the surface 100a of the signal processing IC 100 and surround the magnetoelectric conversion elements 20a and 20b. More specifically, the thin metal plate 14 including the plurality of lead frames 140 is aligned with the thin metal plate 15 and overlapped on the thin metal plate 15, whereby the lead frames 140 are arranged so as to surround the magnetoelectric conversion elements 20a and 20b. Here, the lead frame 140 is arranged above the lead frame 150 so as not to contact the surface 100a which is a circuit surface of the signal processing IC 100. When the lead frame 140 is brought into contact with the circuit surface of the signal processing IC 100, it is difficult to maintain insulation between the lead frame 140 and the signal processing IC 100, and the signal processing IC 100 is likely to undergo dielectric breakdown.

Figure 6C:
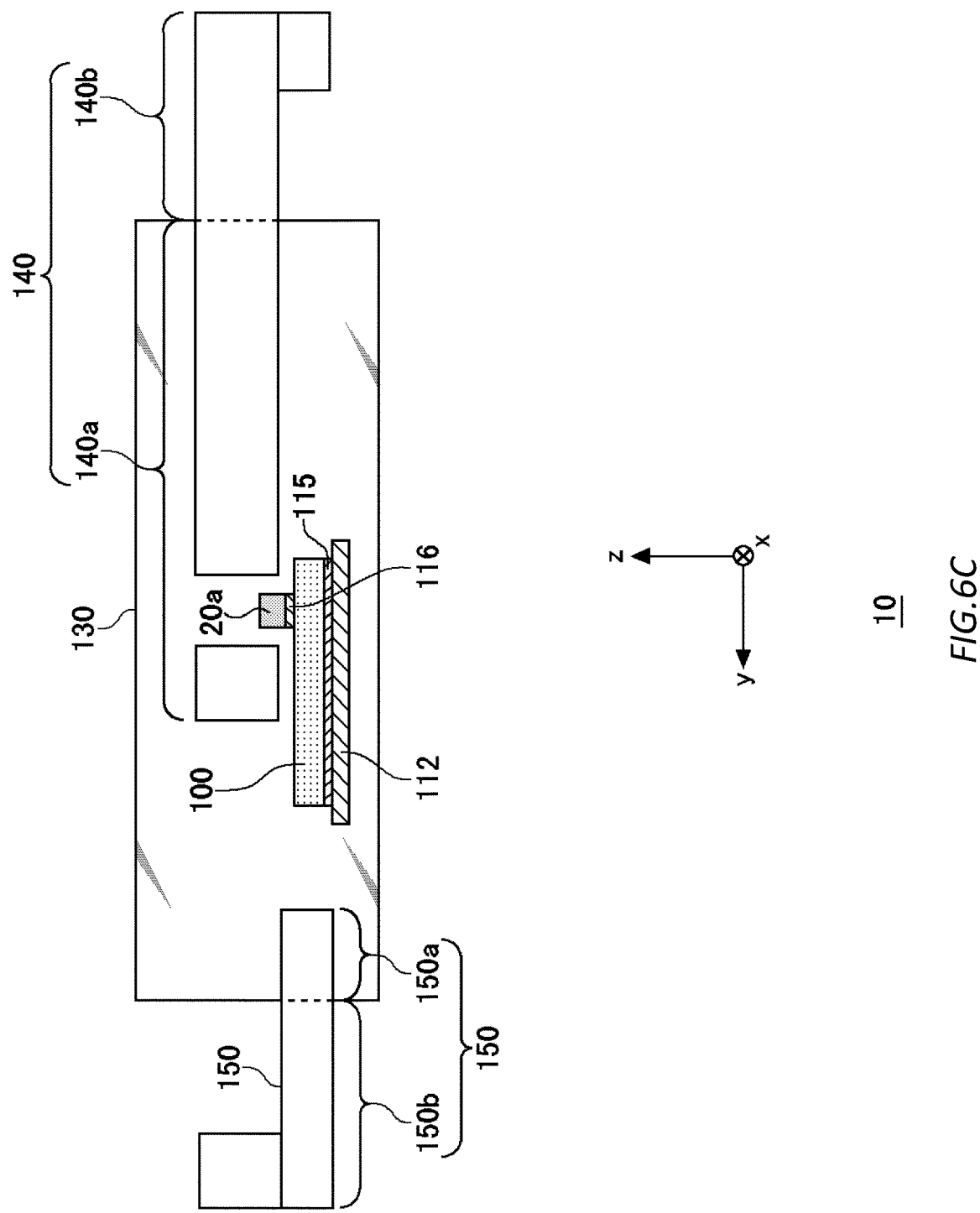
FIG. 6C is a view for explaining the method of manufacturing the current sensor according to the second embodiment.

In this state, as shown in FIG. 6C, in the resin sealing process, the IC support portion 112, the signal processing IC 100, the magnetoelectric conversion elements 20a and 20b, the conductor 140a, and the conductor 150a are sealed with a mold resin, whereby the sealing portion 130 is formed.

As shown in FIG. 6D, the lead terminal 140b and the lead terminal 150b are cut into a desired length, subjected to lead forming to be formed into desired shapes, and the sealed sensor unit is singulated, thereby manufacturing the current sensor 10.

Figure 7A:
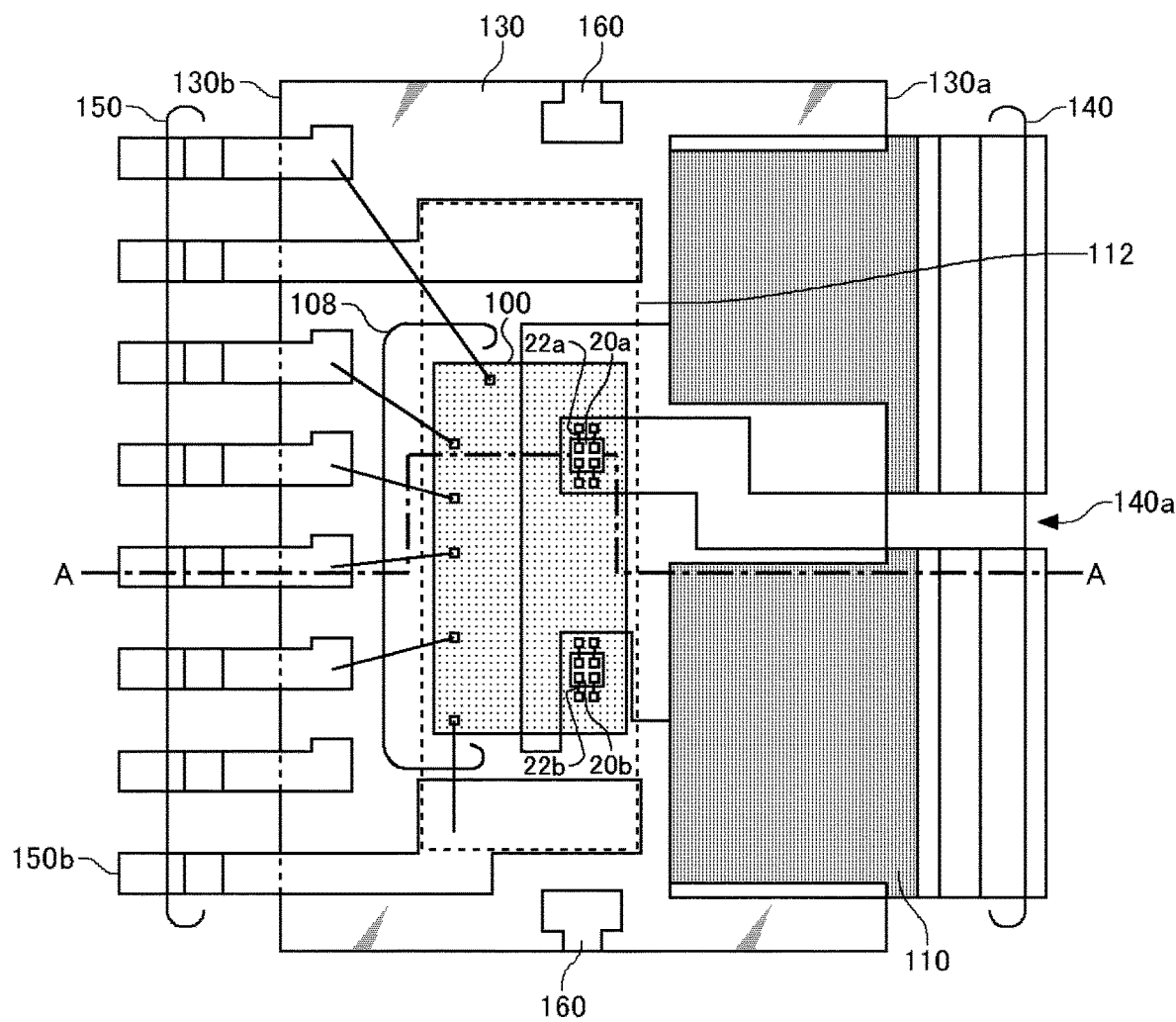
FIG. 7A is a schematic plan view of a current sensor according to a third embodiment as viewed from the ceiling surface side (Z axis direction).
Figure 7A:
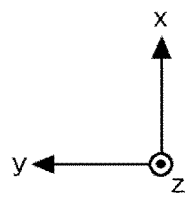
Figure 7B:
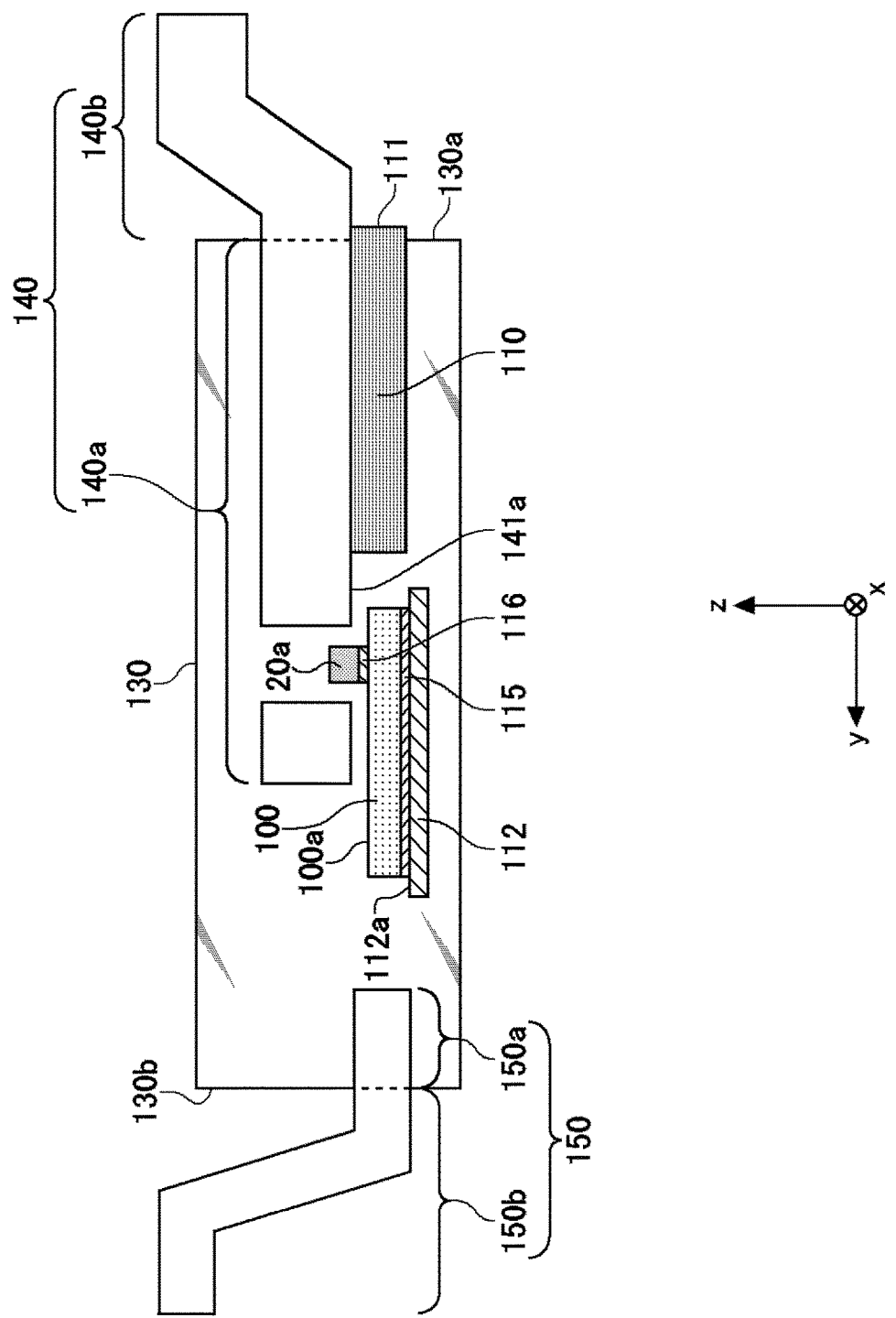
FIG. 7B is an A-A line sectional view of the current sensor shown in FIG. 7A.

FIGS. 7A and 7B show an internal configuration of a semiconductor package functioning as the current sensor 10 according to a third embodiment. FIG. 7A is a schematic plan view of the current sensor 10 according to the third embodiment as viewed from the ceiling surface side (Z axis direction). FIG. 7B is an A-A line sectional view of the current sensor 10 shown in FIG. 7A. Also in the third embodiment, in the side surfaces 130a and 130b, which oppose to each other, of the sealing portion 130, the surface of the lead terminal 150b on the same side as the surface 100a of the signal processing IC 100 may have the same height in the thickness direction (Z axis direction) of the sealing portion 130 as that of the surface of the lead terminal 140b on the same side as the surface on the side opposite to the surface 100a of the signal processing IC 100. The current sensor 10 according to the third embodiment is different from the current sensor 10 according to the second embodiment in that it includes a conductor support portion 110 which supports the surface 141a of the conductor 140a of the lead frame 140 facing the signal processing IC 100.

In addition to the IC support portion 112, the signal processing IC 100, the magnetoelectric conversion elements 20a and 20b, the conductor 140a, and the conductor 150a, the sealing portion 130 seals at least a part of the conductor support portion 110 with a mold resin.

Figure 8:
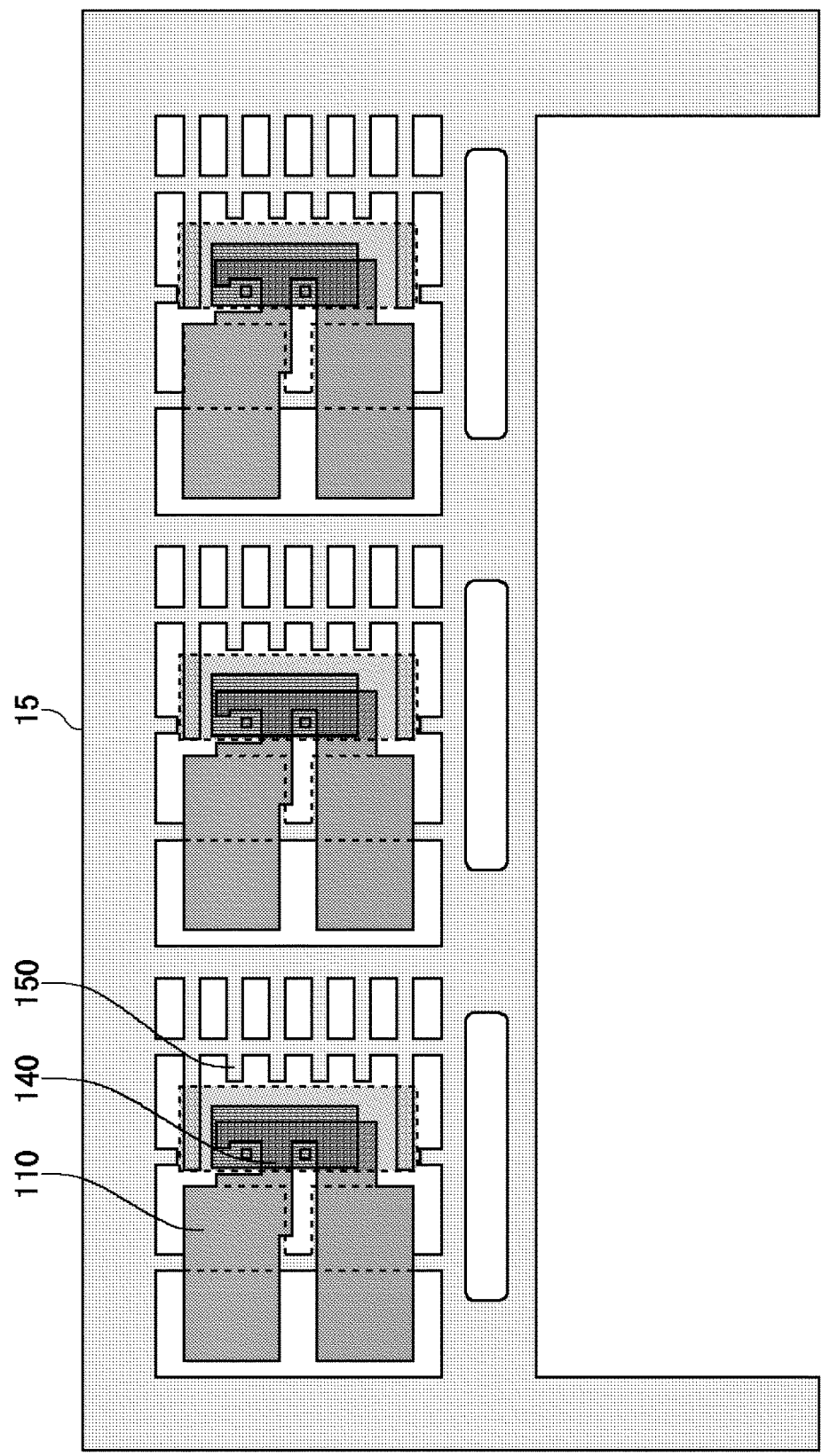
FIG. 8 shows a state in which a lead frame on a primary side is stacked on a thin metal plate constituting a lead frame on a secondary side.

The conductor support portion 110 may have the same thickness as the lead frame 150. The conductor support portion 110 may be made of the same material as the lead frame 150. The conductor support portion 110 may be made of the same metal as the lead frame 150. As shown in FIG. 8, the conductor support portion 110 may be constituted by the thin metal plate 15 constituting the lead frame 150.

With such a configuration, in the manufacturing process, the conductor 140a is formed in a singulated state, so that waste of material is reduced and the manufacturing cost can be suppressed. Since the conductor support portion 110 is constituted by the thin metal plate 15 which is the same member as the lead frame 150, the number of components can be reduced, and the process of arranging the conductor support portion 110 can be performed together with the process of arranging the lead frame 150. That is, the number of manufacturing processes can be reduced, and the manufacturing cost can be suppressed.

The conductor support portion 110 is sealed in the state of being connected to the lead frame 150 at a place positioned in the outer portion of the sealing portion 130, and then a portion exposed to the outer portion of the sealing portion 130 is cut off. Therefore, a side surface 111 at one end of the conductor support portion 110 is exposed from the side surface 130a where the lead terminal 140b of the sealing portion 130 is exposed.

In addition, since the conductor 140a and the lead terminal 140b are configured to be integrated, the electrical resistance at the interface where the conductor 140a and the lead terminal 140b are connected increases, and the measurement current does not flow, so that heat generation is not likely to occur at the interface. Further, due to the heat capacity of the conductor support portion 110, the temperature rise caused by the heat generated by the measurement current flowing through the conductor 140a becomes gentle, and the reliability of the current sensor 10 can be secured.

FIGS. 9A to 9D are views for describing a method of manufacturing the current sensor 10 according to the third embodiment.

Figure 9A:
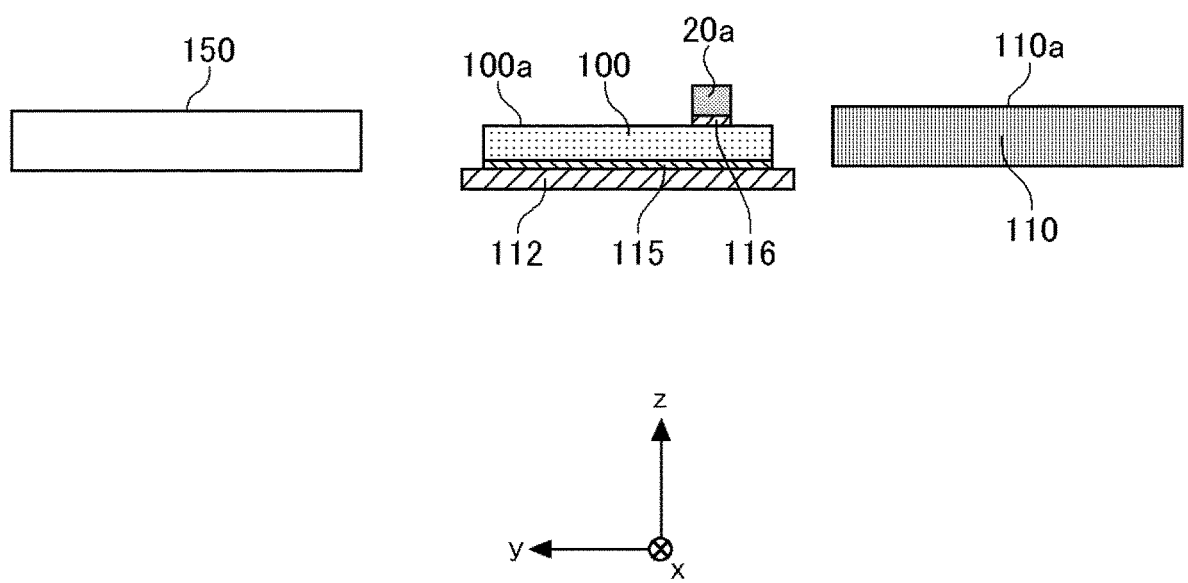
FIG. 9A is a view for describing a method of manufacturing the current sensor 10 according to a third embodiment.

As shown in FIG. 9A, the surface 112a of the IC support portion 112 is adhered to the lead frame 150, and the signal processing IC 100 is adhered onto the surface 112a of the IC support portion 112 via the adhesive layer 115. Further, the magnetoelectric conversion elements 20a and 20b are adhered onto the surface 100a of the signal processing IC 100 via the adhesive layer 116. The signal processing IC 100 and the magnetoelectric conversion elements 20a and 20b are electrically connected by wire bonding.

A plurality of the sensor units assembled in this manner are arranged at predetermined positions of the mold in the state of being mounted on the thin metal plate 15 including the plurality of lead frames 150 and the plurality of conductor support portions 110.

Figure 9B:
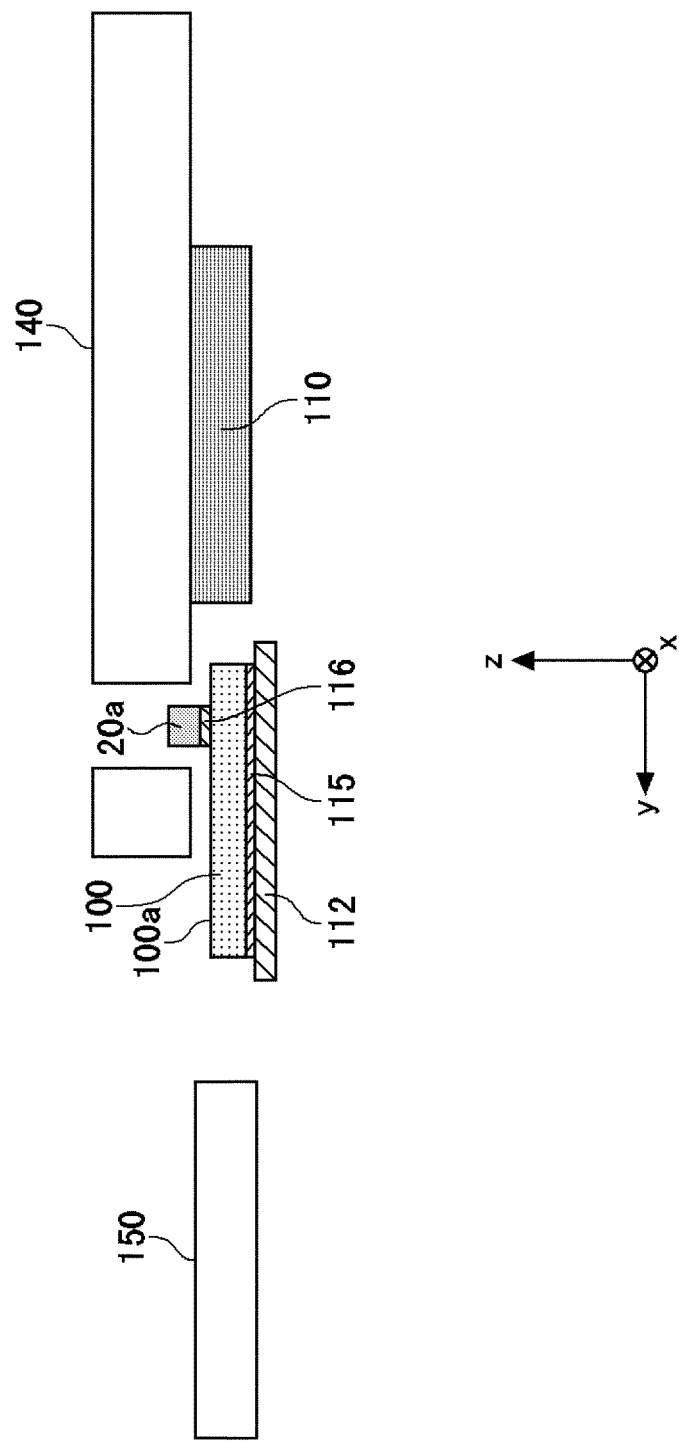
FIG. 9B is a view for describing the method of manufacturing the current sensor 10 according to the third embodiment.

Next, as shown in FIG. 9B, the lead frame 140 is arranged above the conductor support portion 110 so as to face the surface 100a of the signal processing IC 100 and the surface 110a of the conductor support portion 110 and surround the magnetoelectric conversion elements 20a and 20b. The lead frame 140 is supported by the surface 110a of the conductor support portion 110. Here, the lead frame 140 is supported by the surface 110a of the conductor support portion 110, and is arranged above the lead frame 150 so as not to contact the surface 100a which is a circuit surface of the signal processing IC 100.

Figure 9C:
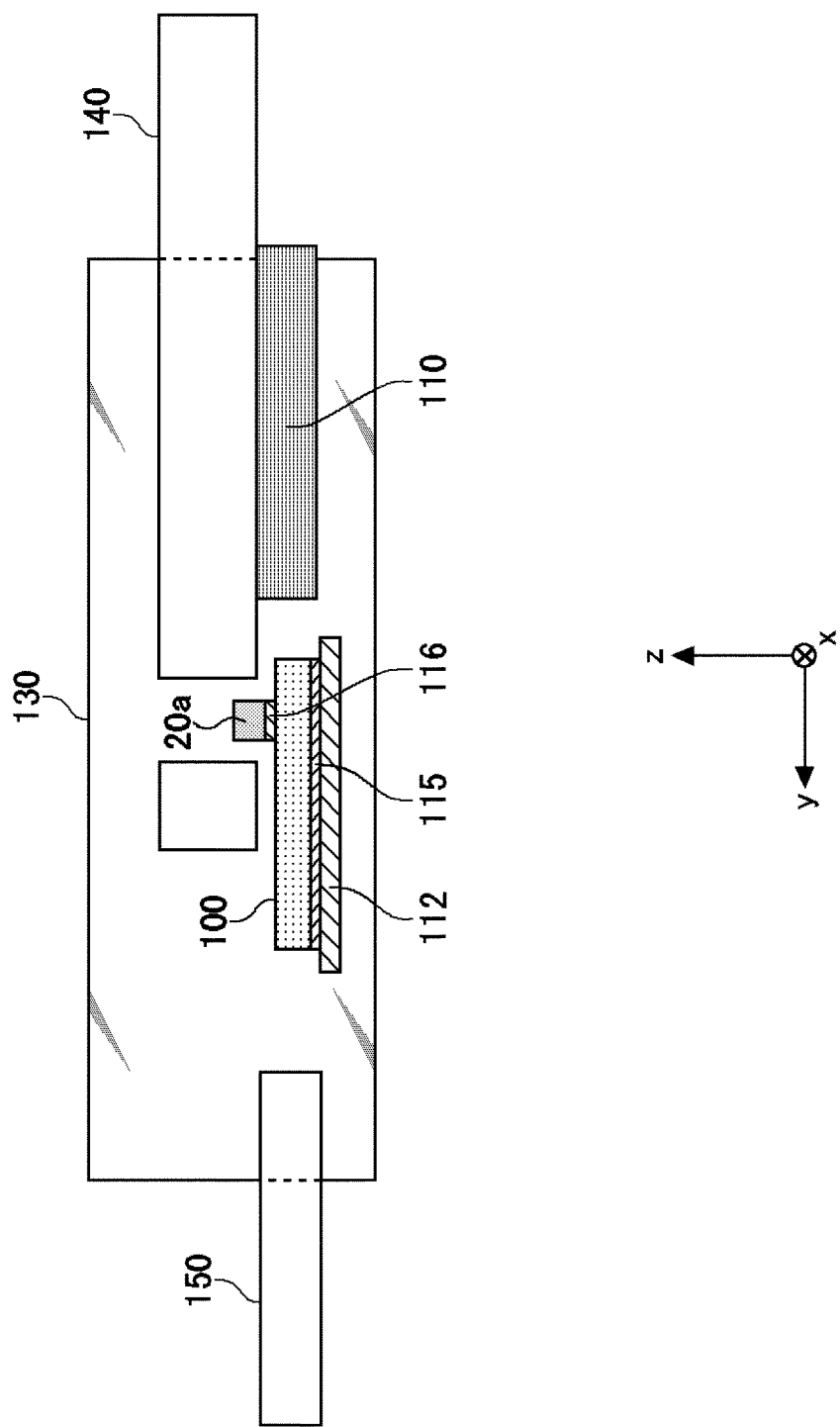
FIG. 9C is a view for describing the method of manufacturing the current sensor 10 according to the third embodiment.

In this state, as shown in FIG. 9C, in the resin sealing process, the IC support portion 112, the signal processing IC 100, the magnetoelectric conversion elements 20a and 20b, the conductor 140a, the conductor 150a, and the conductor support portion 110 are sealed with a mold resin, whereby the sealing portion 130 is formed.

Figure 9D:
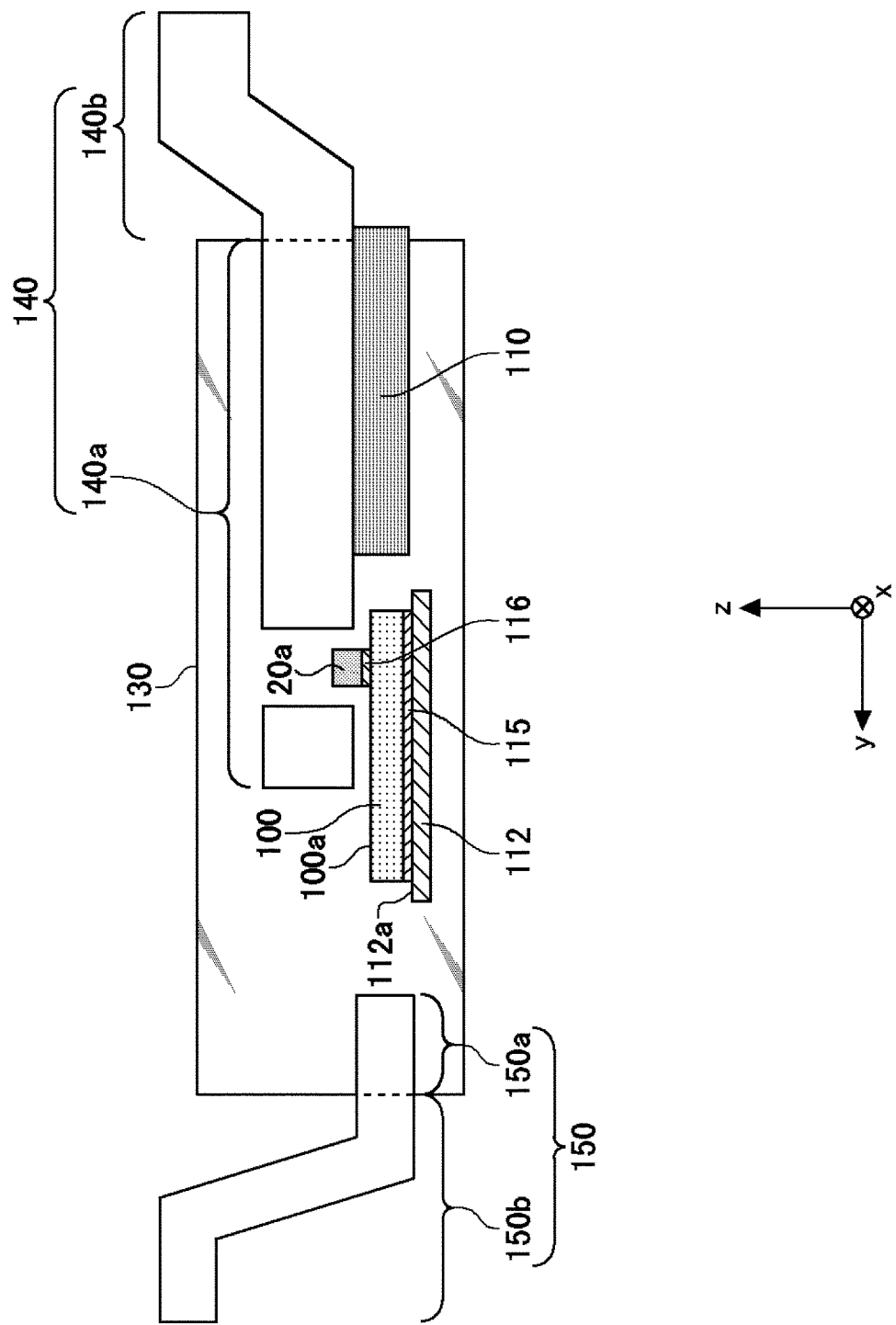
FIG. 9D is a view for describing the method of manufacturing the current sensor 10 according to the third embodiment.

As shown in FIG. 9D, the burr of the sealing portion 130 is removed, the lead terminal 140b and the lead terminal 150b are cut into desired lengths and subjected to lead forming to be formed into desired shapes, and the sealed sensor unit is singulated, thereby manufacturing the current sensor 10.

Figure 10A:
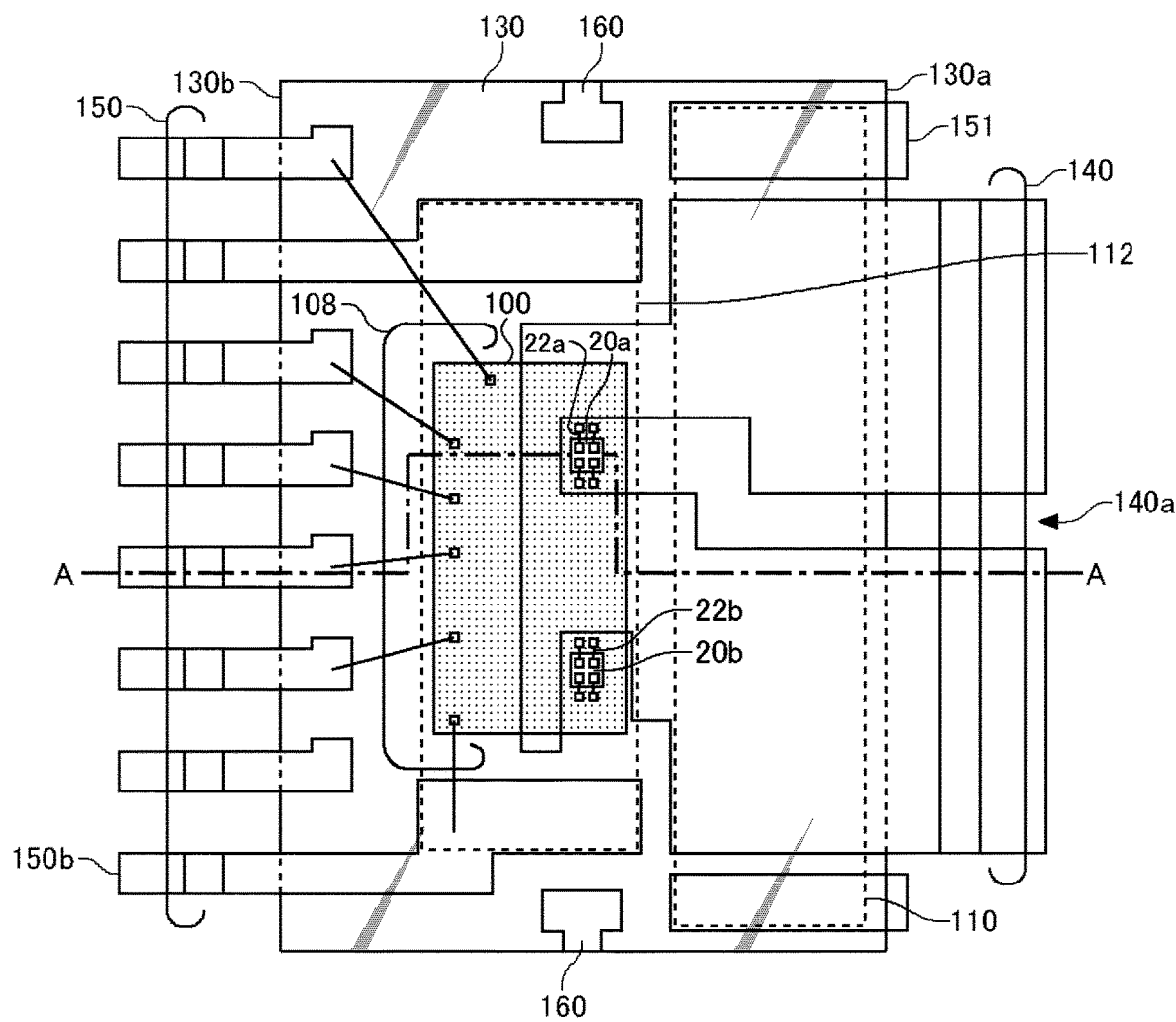
FIG. 10A is a schematic plan view of a current sensor according to a fourth embodiment as viewed from the ceiling surface side (Z axis direction).
Figure 10B:
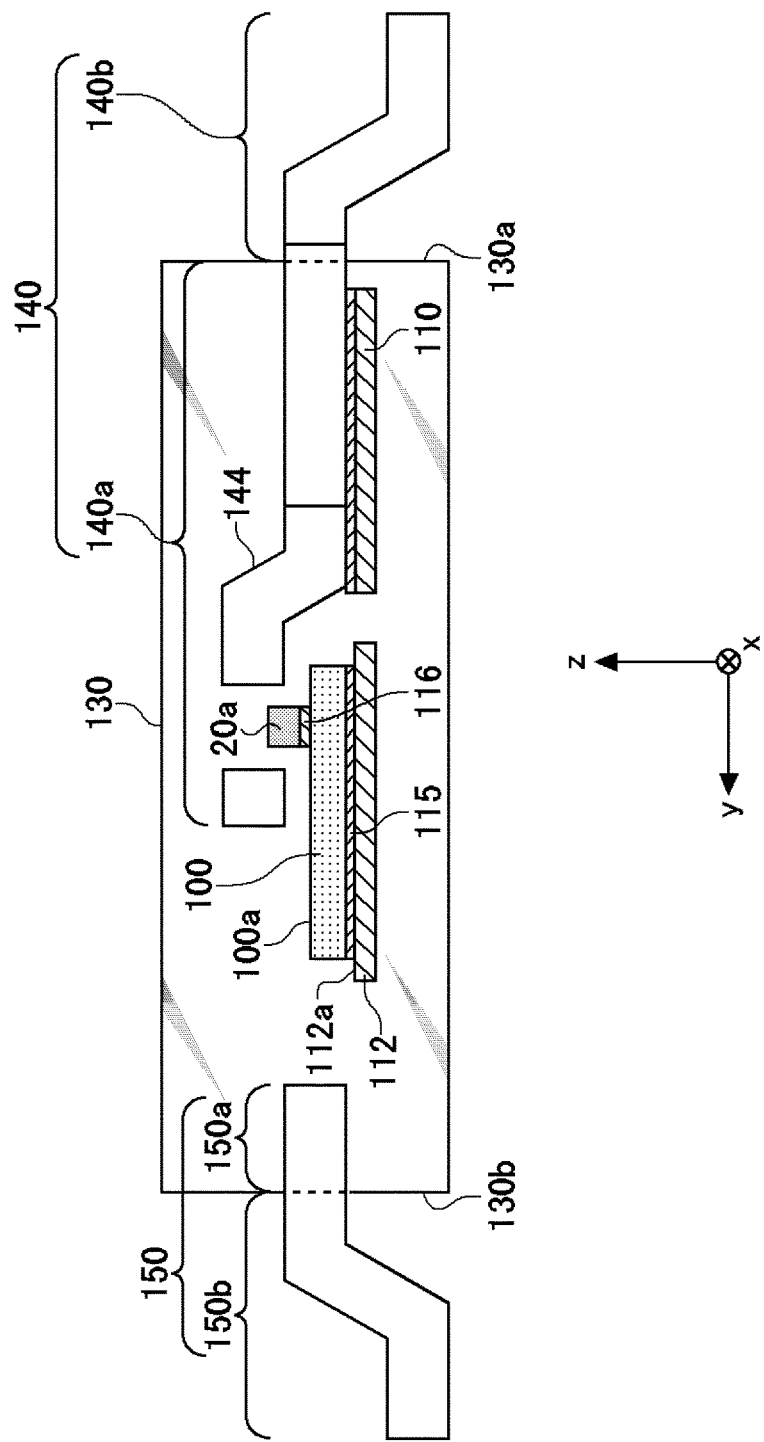
FIG. 10B is an A-A line sectional view of the current sensor shown in FIG. 10A.

FIGS. 10A and 10B show an internal configuration of a semiconductor package functioning as the current sensor 10 according to a fourth embodiment. FIG. 10A is a schematic plan view of the current sensor 10 according to a fourth embodiment as viewed from the ceiling surface side (Z axis direction). FIG. 10B is an A-A line sectional view of the current sensor 10 shown in FIG. 10A.

The current sensor 10 according to the fourth embodiment is different from the current sensor 10 according to the third embodiment in that the conductor support portion 110 is not constituted by the thin metal plate 15 constituting the lead frame 150.

The current sensor 10 according to the fourth embodiment is different from the current sensor 10 according to the first to third embodiments in that the conductor 140a includes a bent portion 144 inclined to the negative side in the Z axis direction toward the conductor support portion 110. The lead terminal 140b and the lead terminal 150b protrude outward from the heights of the side surfaces 130a and 130b, which oppose to each other, of the sealing portion 130, the heights being the same in the thickness direction of the sealing portion 130.

The conductor support portion 110 is further supported by a support 151. The support 151 is sealed in the state of being configured as a part of the lead frame 150, and is then cut off in the process of singulation. Therefore, a part of the support 151 is exposed from the side surface of the sealing resin.

The conductor support portion 110 may be made of the same material as the IC support portion 112. The conductor support portion 110 may have the same thickness as the IC support portion 112.

The IC support portion 112 and the conductor support portion 110 may be constituted by an insulator or a semiconductor. The IC support portion 112 and the conductor support portion 110 may be made of silicon. The IC support portion 112 and the conductor support portion 110 may be made of polyimide. Accordingly, an eddy current due to the current flowing through the lead frame 140 can be suppressed, so that noise is not added to the magnetoelectric conversion elements 20a and 20b, and the current sensor 10 can respond at high speed.

The IC support portion 112 and the conductor support portion 110 may be made of metal. Accordingly, heat dissipation can be improved.

The shape of the mold for sealing is simplified, and the cost can be suppressed since the lead terminal 140b and the lead terminal 150b protrude outward from the heights of the side surfaces 130a and 130b, which oppose to each other, of the sealing portion 130, the heights being the same in the thickness direction of the sealing portion 130.

Hereinbefore, according to each embodiment, in the current sensor 10 in which the magnetoelectric conversion elements 20a and 20b and the signal processing IC 100 are separately configured, even when the magnetoelectric conversion elements 20a and 20b and the signal processing IC 100 are electrically connected by the wires 22a and 22b, the wires 22a and 22b can be shortened, so that the deformation of the wires 22a and 22b can be suppressed, and the influence on the electrical characteristics of the current sensor 10 can be suppressed. In addition, since the magnetic-sensitive surfaces of the magnetoelectric conversion elements 20a and 20b can be surrounded by the conductor 140a, it is possible to suppress a decrease in the sensitivity with which the current sensor 10 senses current.

While the present invention has been described by way of the embodiments, the technical scope of the present invention is not limited to the above described embodiments. It is apparent to persons skilled in the art that various alterations or improvements can be made to the above described embodiments. It is also apparent from description of the claims that the embodiments to which such alterations or improvements are made can be included in the technical scope of the present invention.

It should be noted that the operations, procedures, steps, stages, and the like of each process performed by an apparatus, system, program, and method shown in the claims, embodiments, or diagrams can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

10: current sensor;
14, 15: thin metal plate;
16, 17: hole;
20a, 20b: magnetoelectric conversion element;
21a, 101: pad;
22a, 22b, 108: wire;
100: signal processing IC;
110: conductor support portion;
112: IC support portion;
115, 116: adhesive layer;
130: sealing portion;
140: lead frame;
140a: conductor;
140b: lead terminal;
142a, 142b: slit;
144: bent portion;
150: lead frame;
150a: conductor;
150b: lead terminal;
160: suspending pin.

What is claimed is:

1. A current sensor comprising:
a first support portion;
a first lead frame which is made of a material different from that of the first support portion, has a first terminal portion, and supports the first support portion;
a signal processing IC which has a first surface supported by a first surface of the first support portion and is electrically connected to the first lead frame;
at least one magnetoelectric conversion element which is configured separately from the signal processing IC, is mounted on a second surface on a side opposite to the first surface of the signal processing IC, and outputs, to the signal processing IC, a signal processed by the signal processing IC; and a second lead frame which has a second terminal portion, at least a part of which is arranged to face the second surface of the signal processing IC, and through which a measurement current to be measured by the at least one magnetoelectric conversion element flows.

2. The current sensor according to claim 1, wherein the at least one magnetoelectric conversion element is at least partially surrounded by the second lead frame in a plan view, or is positioned to overlap the second lead frame.

3. The current sensor according to claim 1, wherein the at least one magnetoelectric conversion element is a Hall element and is at least partially surrounded by the second lead frame in a plan view.

4. The current sensor according to claim 1, wherein the at least one magnetoelectric conversion element is a magnetoresistive element or a flux gate element, and is positioned to overlap the second lead frame in a plan view.

5. The current sensor according to claim 1, wherein the first lead frame supports the first surface of the first support portion.

6. The current sensor according to claim 1, wherein the at least one magnetoelectric conversion element and the signal processing IC are electrically connected via a conductor.

7. The current sensor according to claim 6, wherein the signal processing IC includes a first pad on the second surface, the at least one magnetoelectric conversion element includes a second pad on a first surface on a side opposite to a second surface facing the signal processing IC, and the conductor is a wire which electrically connects the first pad and the second pad, and the wire does not straddle the second lead frame.

8. The current sensor according to claim 6, wherein the conductor includes a through hole passing through an inside of the at least one magnetoelectric conversion element, and the at least one magnetoelectric conversion element and the signal processing IC are electrically connected via the through hole.

9. The current sensor according to claim 1, wherein a magnetic-sensitive surface of the at least one magnetoelectric conversion element is positioned between a second surface of the second lead frame facing the signal processing IC and a first surface of the second lead frame opposing to the second surface when viewed from a direction along the magnetic-sensitive surface.

10. The current sensor according to claim 1, wherein a distance between the signal processing IC and the second lead frame is less than 0.22 mm.

11. The current sensor according to claim 1, wherein the signal processing IC includes, on the second surface, a plurality of first pads to be electrically connected to the magnetoelectric conversion element, and a distance in a planar direction between the second lead frame and at least one first pad of the plurality of first pads is less than 0.27 mm.

12. The current sensor according to claim 1, further comprising a sealing portion which seals, with a mold resin, the first support portion, the signal processing IC, the at least one magnetoelectric conversion element, a portion of the first lead frame other than the first terminal portion, and a portion of the second lead frame other than the second terminal portion.

13. The current sensor according to claim 12, wherein the second terminal portion of the second lead frame and the portion of the second lead frame other than the second terminal portion are configured to be integrated physically.

14. The current sensor according to claim 12, wherein the second lead frame is electrically insulated from the at least one magnetoelectric conversion element and the signal processing IC by the sealing portion.

15. The current sensor according to claim 12, wherein the first terminal portion and the second terminal portion protrude outward from side surfaces, which oppose to each other, of the sealing portion, and in the side surfaces, which oppose to each other, of the sealing portion, a surface of the first terminal portion on a same side as the second surface of the signal processing IC is positioned as a same height in a thickness direction of the sealing portion as a surface of the second terminal portion on a same side as the first surface of the signal processing IC, or the surface of the first terminal portion on the same side as the second surface of the signal processing IC is positioned below the surface of the second terminal portion on the same side as the first surface of the signal processing IC in the thickness direction of the sealing portion.

16. The current sensor according to claim 12, wherein the first terminal portion and the second terminal portion protrude outward from side surfaces, which oppose to each other, of the sealing portion, and in the side surfaces, which oppose to each other, of the sealing portion, a surface of the first terminal portion on a same side as the second surface of the signal processing IC is positioned as a same height in a thickness direction of the sealing portion as a surface of the second terminal portion on a same side as the first surface of the signal processing IC.

17. The current sensor according to claim 12, wherein the first support portion is constituted by an insulator or a semiconductor.

18. The current sensor according to claim 12, wherein the first support portion is made of silicon.

19. The current sensor according to claim 12, wherein the first support portion is made of polyimide.

20. The current sensor according to claim 1, wherein the second lead frame is thicker than the first lead frame.

21. The current sensor according to claim 1, wherein the signal processing IC is thinner than the first lead frame.

22. The current sensor according to claim 1, further comprising a second support portion which supports a surface of the second lead frame facing the signal processing IC.

23. The current sensor according to claim 22, further comprising a sealing portion which seals, with a mold resin, the first support portion, at least a part of the second support portion, the signal processing IC, the at least one magnetoelectric conversion element, a portion of the first lead frame other than the first terminal portion, and a portion of the second lead frame other than the second terminal portion, wherein a side surface of one end of the second support portion is exposed from a side surface of the sealing portion from which the second terminal portion of the second lead frame is exposed.

24. The current sensor according to claim 23, wherein the second support portion is made of a same material as the first lead frame.

25. The current sensor according to claim 24, wherein the first lead frame and the second support portion are made of metal.

26. The current sensor according to claim 23, wherein the second support portion has a same thickness as the first lead frame.

27. The current sensor according to claim 22, further comprising a third support portion which is adhered to the second support portion at a same height as an adhering surface between the second lead frame and the second support portion.

28. The current sensor according to claim 27, further comprising
a sealing portion which seals, with a mold resin, the first support portion, the second support portion, and a part of the third support portion, the signal processing IC, the at least one magnetoelectric conversion element, a portion of the first lead frame other than the first terminal portion, and a portion of the second lead frame other than the second terminal portion, wherein
the portion of the second lead frame other than the second terminal portion includes a bent portion inclined toward the second support portion.

29. The current sensor according to claim 28, wherein the third support portion is made of a same material as the first lead frame.

30. The current sensor according to claim 29, wherein the first lead frame and the third support portion are made of metal.

31. The current sensor according to claim 28, wherein the third support portion has a same thickness as the first lead frame.

32. The current sensor according to claim 28, wherein the first support portion and the second support portion are constituted by an insulator or a semiconductor.

33. The current sensor according to claim 32, wherein the first support portion and the second support portion are made of silicon.

34. The current sensor according to claim 32, wherein the first support portion and the second support portion are made of polyimide.

35. The current sensor according to claim 28, wherein the first terminal portion and the second terminal portion protrude outward from heights of side surfaces, oppose to each other, of the sealing portion, the heights being same in a thickness direction of the sealing portion.

* * * * *